(12) United States Patent
Yu et al.

US011095472B2

(10) Patent No.: US 11,095,472 B2
(45) Date of Patent: Aug. 17, 2021

(54) VISION-BASED OBJECT RECOGNITION DEVICE AND METHOD FOR CONTROLLING THE SAME

(71) Applicant: Samsung Electronics Co., Ltd., Gyeonggi-do (KR)

(72) Inventors: Yong-Ju Yu, Seoul (KR); Chan-Won Lee, Gyeonggi-do (KR); Si-Hak Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/865,507

(22) Filed: May 4, 2020

(65) Prior Publication Data

US 2020/0287739 A1     Sep. 10, 2020

Related U.S. Application Data

(63) Continuation of application No. 15/900,980, filed on Feb. 21, 2018, now Pat. No. 10,644,898.

(30) Foreign Application Priority Data

Feb. 24, 2017   (KR) .................. 10-2017-0025086

(51) Int. Cl.
*H04L 12/28*     (2006.01)
*G10L 15/22*     (2006.01)
(Continued)

(52) U.S. Cl.
CPC ............ *H04L 12/282* (2013.01); *G06F 3/167* (2013.01); *G10L 15/22* (2013.01);
(Continued)

(58) Field of Classification Search
CPC .............. H04L 12/282; H04N 5/44582; H04N 5/23299; H04N 5/23218; H04N 5/23203; H04N 5/23225; G06F 3/167; G10L 15/22
(Continued)

(56) References Cited

U.S. PATENT DOCUMENTS 6,516,247 B2    2/2003  Funada
7,173,604 B2    2/2007  Marvit et al.
(Continued)

FOREIGN PATENT DOCUMENTS

EP       1 186 162 B1     7/2013
EP       2950510 A1      12/2015

OTHER PUBLICATIONS

International Search Report dated Nov. 24, 2020.

*Primary Examiner* — Pritham D Prabhakher
(74) *Attorney, Agent, or Firm* — Cha & Reiter, LLC

(57) ABSTRACT

Embodiments of the present disclosure relate to vision-based object recognition devices and methods for controlling the same. According to an embodiment of the present disclosure, an electronic device may comprise a camera, at least one motor, a communication interface, at least one processor, and a memory electrically connected with the processor, wherein the memory may store commands that, when executed by the processor, cause the processor to identify a motion of an external object using a first image obtained by controlling the camera, obtain first direction information based on the identified motion of the external object, drive the at least one motor so that the camera faces a direction determined according to the first direction information, and identify a second electronic device from a second image obtained by controlling the camera facing the determined direction.

20 Claims, 12 Drawing Sheets

(51) Int. Cl.
  *H04N 5/232* (2006.01)
  *G06F 3/16* (2006.01)
(52) U.S. Cl.
  CPC ..... *H04N 5/23203* (2013.01); *H04N 5/23218* (2018.08); *H04N 5/23225* (2013.01); *H04N 5/23299* (2018.08)
(58) Field of Classification Search
  USPC .................................................. 348/211.99
  See application file for complete search history.

(56) References Cited

U.S. PATENT DOCUMENTS

| | | | |
|---|---|---|---|
| 9,454,820 B1* | 9/2016 | Kirmani | ............... H04N 5/33 |
| 9,478,123 B2 | 10/2016 | Lee | |
| 9,503,628 B1 | 11/2016 | Alsalamah | |
| 9,911,351 B2 | 3/2018 | White et al. | |
| 9,966,070 B2 | 5/2018 | Koetz | |
| 9,984,686 B1 | 5/2018 | Mutagi et al. | |
| 10,104,280 B2* | 10/2018 | Butts | ............... H04N 5/232 |
| 10,269,344 B2 | 4/2019 | Lee et al. | |
| 10,416,625 B2 | 9/2019 | Marti et al. | |
| 10,446,145 B2 | 10/2019 | Kim et al. | |
| 10,505,752 B2 | 12/2019 | Ha et al. | |
| 10,506,322 B2 | 12/2019 | Martin et al. | |
| 10,686,984 B1* | 6/2020 | Schmidt | ............ H04N 5/23238 |
| 2002/0047905 A1* | 4/2002 | Kinjo | ............ G06Q 30/0643 |
| | | | 348/211.99 |
| 2002/0114519 A1 | 8/2002 | Mastrianni et al. | |
| 2004/0051787 A1* | 3/2004 | Mutsuro | ............ H04N 1/00137 |
| | | | 348/211.99 |
| 2007/0210932 A1 | 9/2007 | Koshiba et al. | |
| 2007/0252721 A1 | 11/2007 | Geurts | |
| 2009/0133051 A1 | 5/2009 | Hildreth | |
| 2010/0281066 A1 | 11/2010 | Haughawout et al. | |
| 2012/0127072 A1 | 5/2012 | Kim | |
| 2013/0010207 A1 | 1/2013 | Valik et al. | |
| 2013/0162852 A1* | 6/2013 | Boyle | ............... H04N 5/222 |
| | | | 348/211.99 |
| 2013/0188062 A1* | 7/2013 | Konicek | ............ H04N 5/2257 |
| | | | 348/207.1 |
| 2014/0062879 A1 | 3/2014 | Mekenkamp et al. | |
| 2015/0138333 A1 | 5/2015 | DeVaul et al. | |
| 2015/0194050 A1 | 7/2015 | Lee | |
| 2015/0279369 A1* | 10/2015 | Lee | ............... H04N 21/431 |
| | | | 704/275 |
| 2015/0314454 A1* | 11/2015 | Breazeal | ............... B25J 9/0003 |
| | | | 700/259 |
| 2016/0105598 A1* | 4/2016 | Zeira | ............... H04N 5/2252 |
| | | | 348/143 |
| 2016/0127641 A1* | 5/2016 | Gove | ............... G01B 11/00 |
| | | | 348/143 |
| 2016/0150124 A1* | 5/2016 | Panda | ............... H04N 1/4433 |
| | | | 358/1.13 |
| 2016/0286116 A1* | 9/2016 | Ohtsuka | ........... H04N 5/225251 |
| 2017/0004828 A1 | 1/2017 | Lee et al. | |
| 2017/0041523 A1* | 2/2017 | Rifkin | ............... H04N 5/23203 |
| 2017/0084275 A1 | 3/2017 | Koetz | |
| 2017/0133009 A1 | 5/2017 | Cho et al. | |
| 2017/0154626 A1 | 6/2017 | Kim et al. | |
| 2017/0155831 A1* | 6/2017 | Jang | ............... G06K 9/00604 |
| 2017/0206900 A1* | 7/2017 | Lee | ............... G10L 15/22 |
| 2017/0339340 A1* | 11/2017 | De Bayser | ......... H04N 5/23216 |
| 2017/0374273 A1* | 12/2017 | Butts | ............... G10L 15/22 |
| 2018/0061276 A1* | 3/2018 | Baca | ............... G10L 15/22 |
| 2018/0121712 A1 | 5/2018 | Garrett | |
| 2018/0137858 A1 | 5/2018 | Saxena et al. | |

\* cited by examiner

VISION-BASED OBJECT RECOGNITION DEVICE AND METHOD FOR CONTROLLING THE SAME

CROSS REFERENCE TO RELATED APPLICATIONS

This application is a Continuation of U.S. patent application Ser. No. 15/900,980 filed on Feb. 21, 2018 which claims the benefit under 35 U.S.C. § 119(a) of a Korean patent application filed in the Korean Intellectual Property Office on Feb. 24, 2017 and assigned Serial No. 10-2017-0025086, the entire disclosure of which is incorporated herein by reference.

TECHNICAL FIELD

Embodiments of the present disclosure generally relate to vision-based object recognition devices and methods for controlling the same.

BACKGROUND

The Internet is evolving from the human-centered connection network by which humans create and consume information to an Internet of Things (IoT) network by which information is communicated and processed between things (i.e. devices) or other distributed components. For example, an Internet of Everything (IoE) may be a combination of "Big Data" data processing technology and an IoT network. In an IoE, connected device may be connected to a cloud server that performs "Big Data" data processing.

An IoT network may include various components/technologies, such as sensing technology, wired/wireless communication and network infrastructure, service interface technology, security, etc. Recent ongoing research have been directed to inter-object connection technologies, such as sensor networks, Machine-to-Machine (M2M) technologies, or Machine-Type Communication (MTC).

Also, the IoT environment may offer intelligent Internet Technology (IT) services that collect and analyze data generated by devices connected in the IoT network. IoT networks may have various applications, such as being smart homes, smart buildings, smart cities, smart cars or connected cars, other smart appliances, smart power grids, being used in healthcare as intelligent medical devices, etc.

For example, in a smart home context, an IoT network may be used to connect and control various home electronic devices. The user may control various objects connected together via the IoT network by using a master electronic device (e.g. the user's smartphone) that includes a processor and a communication interface. For example, the electronic device may control the various home electronic devices based on voice commands received from the user.

Meanwhile, the plurality of objects connected together via the IoT network may include objects of same or similar type, name, or function. For example, a plurality of lights, sound devices, or displays may be present in a household. These lights, sound devices, or displays may be connected together via the IoT network. In such case, when the user wishes to control a particular object, he or she may be required to manually distinguish the object from other similar objects, which may be cumbersome. For example, where the electronic device receives the voice command "turn on the lamp" from the user, the electronic device may have difficulty determining which one of the multiple lights connected in the IoT network should be turned on. In this case, the electronic device may turn on the wrong lamp.

The above information is presented as background information only to assist with understanding the present disclosure. No determination has been made, and no assertion is made, as to whether any of the above might be applicable as prior art with regard to the present disclosure.

SUMMARY

According to an embodiment of the present disclosure, an electronic device may identify the user's motion through vision-based recognition. The electronic device may then identify a particular object that the user desires to control on the identified user motion. The electronic device may control the identified object based on commands received from the user. The electronic device may move or turn to the identified object. The user may identify whether commands for controlling the object have been delivered to the electronic device based on the movement or turn of the electronic device.

According to an embodiment of the present disclosure, an electronic device may comprise a camera, at least one motor, a communication interface, at least one processor, and a memory electrically connected with the processor, wherein the memory may store commands that, when executed by the processor, cause the processor to identify a motion of an external object using a first image obtained by controlling the camera, obtain first direction information based on the identified motion of the external object, drive the at least one motor so that the camera faces a direction determined according to the first direction information, and identify a second electronic device from a second image obtained by controlling the camera facing the determined direction.

According to an embodiment of the present disclosure, a method for controlling, through an electronic device including a camera, another electronic device may comprise identifying a motion of an external object using a first image obtained by controlling the camera, obtaining first direction information based on the identified motion of the external object, driving at least one motor of the electronic device so that the camera faces a direction determined according to the first direction information, and identifying a second electronic device from a second image obtained by controlling the camera facing the determined direction.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the present disclosure and many of the aspects thereof will be better understood after referring to the following detailed description of the drawings, wherein.

Throughout the drawings, like reference numerals will be understood to refer to like parts, components, and structures.

DETAILED DESCRIPTION

Figure 1A:
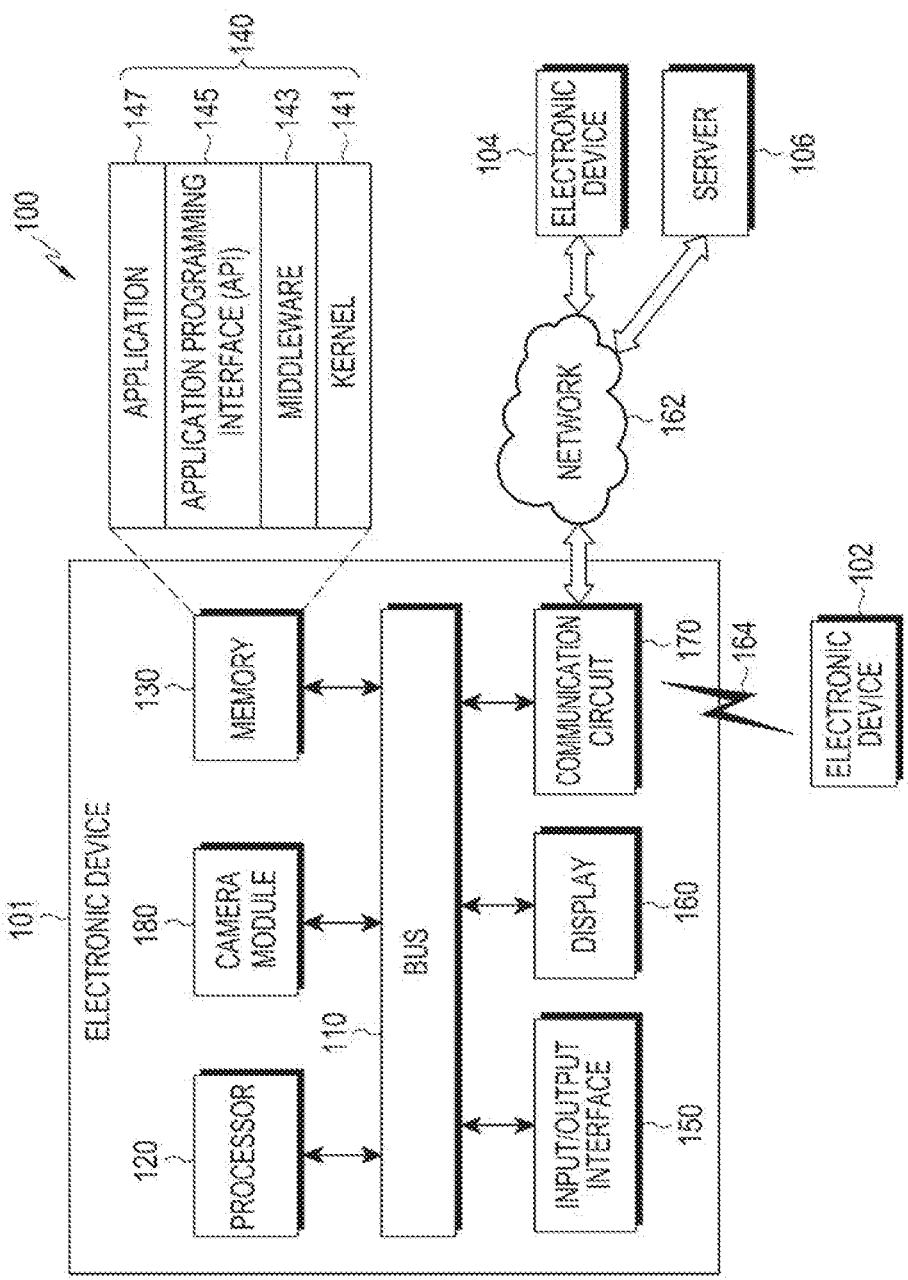
FIG. 1A is a block diagram illustrating an electronic device and a network according to an embodiment of the present disclosure.

Hereinafter, embodiments of the present disclosure are described with reference to the accompanying drawings. However, it should be appreciated that the present disclosure is not limited to the embodiments and the terminology used herein, and all changes and/or equivalents or replacements thereto also are within the scope of the present disclosure. It is to be understood that the singular forms "a," "an," and "the" may also refer to the plural, unless the context clearly indicates otherwise.

As used herein, the terms "A or B" or "at least one of A and/or B" may include all possible combinations of A and B. The terms "first" and "second" may refer to various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of" "modified to," "made to," "adapted to," "able to," or "designed to" in hardware or software. A device "configured to" perform certain operations may mean that the device can perform the operations by itself or together with another device. For example, the term "processor configured (or set) to perform A, B, and C" may mean a general-purpose processor (e.g., a CPU or application processor) that may perform the operations by executing one or more software programs stored in a memory device or a dedicated processor (e.g., an embedded processor) for performing the operations.

Electronic devices according to various embodiments of the present disclosure may be smartphones, tablet personal computer (PC)s, mobile phones, video phones, e-book readers, desktop PCs, laptop computers, netbook computers, workstations, servers, personal digital assistants (PDAs), portable multimedia players (PMPs), MP3 players, medical devices, cameras, wearable devices, etc. Wearable devices may include accessory-type devices (e.g., watches, rings, bracelets, anklets, necklaces, glasses, contact lenses, or head-mounted devices (HMD)), fabric- or clothes-integrated devices (e.g., electronic clothes), body attaching-type devices (e.g., skin pads or tattoos), or body implantable devices.

According to another embodiment, the electronic devices may be home appliance such as televisions, digital video disk (DVD) players, audio players, refrigerators, air conditioners, cleaners, ovens, microwave ovens, washers, dryers, air cleaners, set-top boxes, home automation control panels, security control panels, TV set-top boxes (e.g., Samsung HomeSync™, Apple TV™, or Google TV™), gaming consoles (e.g. Xbox™, PlayStation™), electronic dictionaries, electronic keys, camcorder, electronic picture frames, etc.

According to another embodiment, the electronic devices may be medical devices (e.g., various portable medical measuring devices such as blood sugar measuring devices, heartbeat measuring devices, body temperature measuring devices, etc., magnetic resource angiography (MRA) devices, magnetic resource imaging (MRI) devices, computed tomography (CT) devices, other medical imaging devices, ultrasonic devices, etc.), navigation devices, global navigation satellite system (GNSS) receivers, event data recorders (EDRs), flight data recorders (FDRs), automotive infotainment devices, sailing electronic devices (e.g., sailing navigation devices or gyro compasses), avionics, security devices, vehicular head units, industrial or home robots, drones, automatic teller machines (ATMs), point of sales (POS) devices, or internet of things (IoT) devices (e.g., light bulbs, various sensors, sprinklers, fire alarms, thermostats, street lights, toasters, fitness equipment, hot water tanks, heaters, boilers, etc.).

According to another embodiment of the disclosure, the electronic devices may be at least one of part of a piece of furniture, building/structures, vehicles, electronic boards, electronic signature receiving devices, projectors, various measurement devices (e.g., devices for measuring water, electricity, gas, or electromagnetic waves), etc.

According to embodiments of the present disclosure, the electronic device may be flexible and may be a combination of the above-enumerated electronic devices. The electronic device disclosed herein is not limited to the above-listed embodiments. As used herein, the term "user" may refer a human or another device (e.g., an artificial intelligent electronic device) using the electronic device.

Referring to FIG. 1A, according to an embodiment of the present disclosure, an electronic device 101 is included in a network environment 100. The electronic device 101 may include a bus 110, a processor 120, a memory 130, an input/output interface 150, a display 160, a communication interface 170, and a camera module 180. In some embodiments, the electronic device 101 may exclude at least one of the components or may add another component.

The bus 110 may include a circuit for connecting the components 110 to 180 with one another and transferring communications (e.g., control messages or data) between the components.

The processor 120 may be a central processing unit (CPU), an application processor (AP), and/or a communication processor (CP). The processor 120 may control at least one of the other components of the electronic device 101. The processor 120 may also perform operations and data processing related to the various functions of the electronic device 101. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory 130 may include a volatile and/or non-volatile memory. For example, the memory 130 may store commands or data related to at least one other component of the electronic device 101. According to an embodiment of the present disclosure, the memory 130 may store software and/or a program 140.

The program 140 may include, e.g., a kernel 141, middleware 143, an application programming interface (API) 145, and/or an application program (or "application") 147. At least a portion of the kernel 141, middleware 143, or API 145 may be part of an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may also provide an interface that allows the middleware 143, the API 145, or the application 147 to access the individual components of the electronic device 101. The middleware 143 may function as a relay to allow the API 145 or the application 147 to communicate data with the kernel 141, for example. Further, the middleware 143 may process one or more task requests received from the application program 147 in order of priority. In other words, the middleware 143 may assign priorities for using system resources (e.g., bus 110, processor 120, or memory 130) to the application programs 147 and process one or more task requests based on those priorities. The API 145 is an interface allowing the application 147 to control functions provided from the kernel 141 or the middleware 143. For example, the API 133 may include interfaces or functions (e.g., commands) for filing control, window control, image processing or text control.

The input/output interface 150 may transfer commands or data input from the user or another external device to the component(s) of the electronic device 101 or may output commands or data received from the component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., touch, gesture, proximity or hovering inputs via an electronic pen or a portion of the user's body (e.g. a finger).

The communication interface 170 may set up communication between the electronic device 101 and an external electronic device (e.g., the first electronic device 102, the second electronic device 104, or the server 106). For example, the communication interface 170 may be connected with the network 162 through wireless or wired communication to communicate with the external electronic devices.

Wireless communication, denoted as element 164 of FIG. 1. may be cellular communication that employs protocols such as long term evolution (LTE), long term evolution-advanced (LTE-A), code division multiple access (CDMA), wideband code division multiple access (WCDMA), universal mobile telecommunication system (UMTS), wireless broadband (WiBro), global system for mobile communication (GSM), etc. The wireless communication may also use non-cellular protocols such as wireless-fidelity (Wi-Fi), light-fidelity (Li-Fi), Bluetooth, Bluetooth low power (BLE), Zigbee, near-field communication (NFC), magnetic secure transmission (MST), radio frequency (RF), or body area network (BAN). According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used. Wired communication, on the other hand, may employ protocols such as universal serial bus (USB), high definition multimedia interface (HDMI), recommended standard (RS)-232, power line communication (PLC), plain old telephone service (POTS), etc. The network 162 may include be telecommunication networks, e.g., computer networks (e.g., local area network (LAN) or wide area network (WAN)), the Internet, or telephone networks.

The camera module 180 may include at least one image sensor. For example, the image sensor in the camera module 180 may convert light received from the outside of the electronic device into an electrical signal and output the electrical signal. The electrical signal may be output through the bus 110 to the processor 120 and processed by the processor 120 or stored in the memory 130. The camera module 180 may include a pixel array made up of a plurality of pixels, and the pixel array may include photodiodes that convert light from the outside into an analog electrical signal. Meanwhile, the image sensor in the camera module 180 may include an analog-to-digital converter (ADC) that converts the analog electrical signal into a digital electrical signal and outputs the digital electrical signal. The image sensor in the camera module 180 may include a circuit for scanning the pixel array. The image sensor in the camera module 180 may include an internal memory. The image sensor may temporarily store the digital electrical signal, i.e., data output from a pixel, in the internal memory and output the digital electrical signal to an external circuit (e.g., the bus 110, the processor 120, or the memory 130). The image sensor in the camera module 180 may include an interface used for data input/output and may output data to an external circuit according to the output speed of the interface.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 is set to perform one or more functions or services, the electronic device 101 may perform the functions or services on its own. However, alternatively, instead of executing the functions or services on its own, the electronic device 101 may request another device (e.g., electronic devices 102 and 104 or server 106) to perform at least some functions associated therewith. The other electronic device (e.g., electronic devices 102 and 104 or server 106) may execute the requested functions and transfer the result of the execution to the electronic device 101. The electronic device 101 may provide the requested functions or services by processing the received result. To that end, cloud computing, distributed computing, or client-server computing techniques may be used, for example.

Figure 1B:
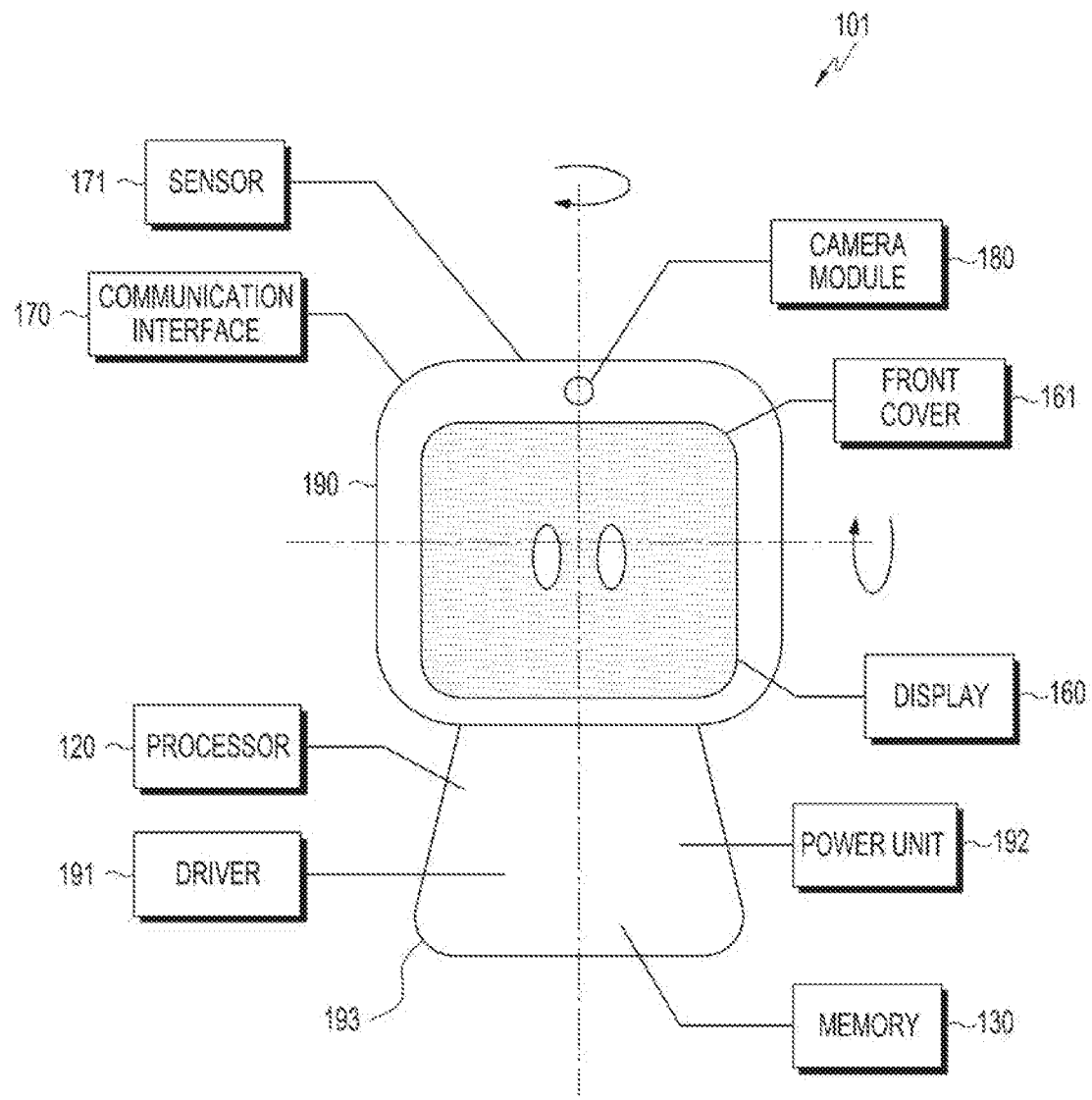
FIG. 1B is a concept view illustrating an electronic device according to an embodiment of the present disclosure.

FIG. 1B is a concept view illustrating an electronic device according to an embodiment of the present disclosure.

As shown in FIG. 1B, the electronic device 101 may be implemented in the form of a robot. The electronic device 101 may include a head portion 190 and a body portion 193. The head portion 190 may be disposed on the body portion 193. The head portion 190 and the body portion 193, in an embodiment, may be implemented in the shape of a human being's head and body, respectively. For example, the head portion 190 may include a front cover 161 corresponding to the shape of a human being's face. The electronic device 101 may include a display 160 disposed at a position corresponding to the front cover 161. The display 160 may include a touchscreen and may receive, e.g., touch, gesture, proximity or hovering inputs via an electronic pen or a portion of the user's body. For example, the display 160 may be disposed inside the front cover 161, and in this case, the front cover 161 may be made up of a transparent or semi-transparent material. Alternatively, the front cover 161 and the display 160 may be implemented as a single hardware device, such that the front cover 161 can be said to be the screen. The front cover 161 may indicate a direction of interacting with the user and may include at least one or more various sensors for image sensing in a direction of interacting with the user, at least one or more microphones for obtaining a voice, and at least one or more hardware (H/W) or instrumental structures that may be an instrumental eye structure or a display for outputting a screen, that enables display through a temporary instrumental change or light in the form of directions being not differentiated, and that may be directed to the user when interacting with the user.

The head portion 190 may further include a communication interface 170, a sensor 171, and a camera module 180. The communication interface 170 may receive various data from an external transmitter and transmit data generated by the electronic device 101 to an external receiver. According to an embodiment of the present disclosure, the communication interface 170 may be implemented as a microphone, and in this case, the communication interface 170 may receive voice commands from the user. The communication interface 170 may also be implemented as a speaker in which case the communication interface 170 may output the data generated by the electronic device 101 as sound.

The sensor 171 may measure various qualities of the external environment surrounding the electronic device 101. For example, the sensor 171 may detect the user or another electronic device approaching the electronic device 101. The sensor 171 may generate proximity information according to the approach of the user or the other electronic device. The sensor 171 may detect the user's approach based on a signal from another electronic device that the user is using. The sensor 171 may also detect the user's motion or position.

The camera module 180 may capture images of the external environment. The electronic device 101 may identify the user or the other electronic device using at least one image obtained through the camera module 180. The electronic device 101 may also identify the user's motion or relative position of the other electronic device based on image(s) obtained through the camera module 180.

The driver 191 may include at least one motor to move the head portion 190. The driver 191 may also be used to move the electronic device 101 or vary the positions of the other components of the electronic device 101. As such, the driver 191 may be capable of moving up, down, left, or right with respect to one or more axes. The power supply 192 may feed power to the electronic device 101.

The processor 120 may obtain data from another electronic device through the communication interface 170 or the sensor 171. The processor 120 may include at least one data analyzing module. The data analyzing module may process received data and transmit the processed data. For example, the processor 120 may analyze data corresponding to a voice input received from the user, generate results of the analysis which needs to be sent to another electronic device, and send the results to the other electronic device.

The memory 130 is storage for permanently or temporarily storing information related to functions or services of the electronic device 101. The memory 130 may be present in the electronic device 101 or may be present in a cloud or other server connected to the electronic device 101 through a network. The memory 130 may store personal information for user authentication, attribute-related information relating to the manner in which services are provided to the user, or relationship information for various entities (users or other electronic devices) that may interact with the electronic device 101. Here, the relationship information may be updated as the electronic device 101 is used or may be otherwise changed. The processor 120 may functionally control the sensor 171, the input/output interface 150, the communication interface 170, and the memory 130 to provide function or services to the user. Further, at least a portion of the processor 120 or the memory 130 may include an information determining unit that may process information obtained by the electronic device 101. For example, the information determining unit may extract data required for a particular service from the information obtained by the sensor 171 or the communication interface 170.

The robot-type implementation of the electronic device 101 shown in the figure is merely an example, and there are no limitations as to the type of implementation. For example, the electronic device 101 may be implemented as a standalone robot. The electronic device 101 may be implemented as a docking station that holds a tablet PC or smart phone. Further, the electronic device 101 may be a stationary device or may be a mobile device. When it is a mobile device, the electronic device 101 may achieve mobility using wheels, mechanical caterpillar devices, mechanical legs, etc. Or the electronic device 101 may be a flying drone.

Figure 2A:
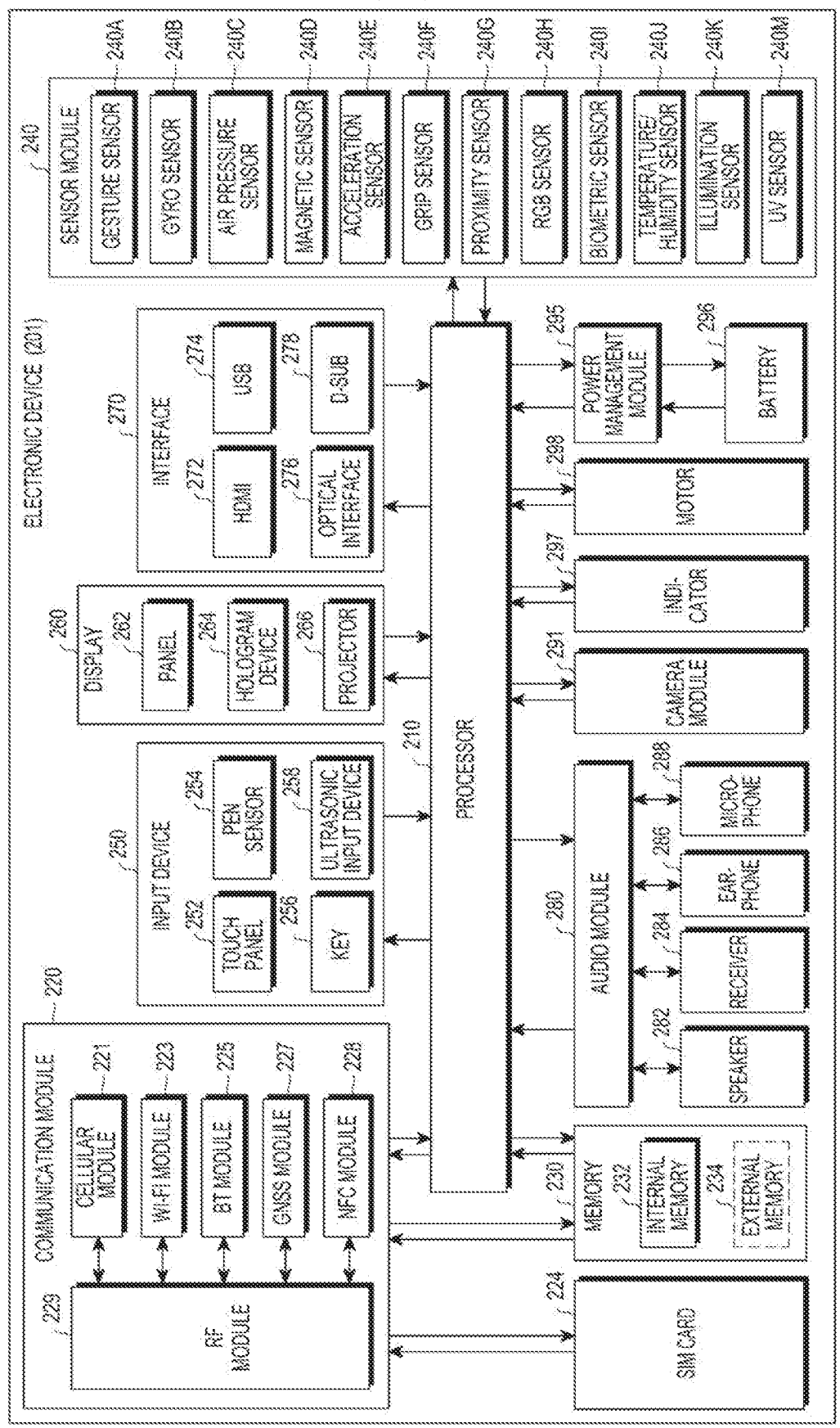
FIG. 2A is a block diagram illustrating an electronic device according to an embodiment of the present disclosure.

FIG. 2A is a block diagram illustrating an electronic device 201 according to an embodiment of the present disclosure. An electronic device 201 may include the whole or part of, e.g., the electronic device 101 of FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an operating system or application programs. In doing so, and the processor 210 may process and compute various pieces of data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2A. The processor 210 may loads commands or data received from at least one of the other components (e.g., the non-volatile memory) onto a volatile memory, process the commands or data, and store resultant data in the non-volatile memory.

The communication module 220 may have the same or similar configuration to the communication interface 170 of FIG. 1A. The communication module 220 may include, e.g., a cellular module 221, a wireless fidelity (Wi-Fi) module 223, a Bluetooth (BT) module 225, a GNSS module 227, a NFC module 228, and a RF module 229. The cellular module 221 may provide voice call, video call, text messaging, or Internet services through, e.g., a cellular communication network. According to an embodiment of the present disclosure, the cellular module 221 may perform identification or authentication of the electronic device 201 in the communication network using a subscriber identification module 224 (e.g., the SIM card). The cellular module 221 may perform at least some of the functions provided by the processor 210. The cellular module 221 may include a communication processor (CP). At least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may transceive data using RF signals. The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the Bluetooth module 225, the GNSS module 227, or the NFC module 228 may transceive RF signals through its own standalone RF module. The subscription identification module 224 may include, e.g., a removable SIM card or an embedded SIM, and may contain unique identification information (e.g., integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid-state drive (SSD)). The external memory 234 may include a flash drive (e.g., a compact flash (CF) memory, a secure digital (SD) memory, a micro-SD memory, a min-SD memory, an extreme digital (xD) memory, a multi-media card (MMC), or a Memory Stick™). The external memory 234 may be functionally or physically connected with the electronic device 201 via various interfaces.

The sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 1210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer to provide an immediate reaction to the user. The (digital) pen sensor 254 may include, e.g., part of the touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or force sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201.

The interface 270 may include e.g., a high definition multimedia interface (HDMI) 272, a USB 274, an optical interface 276, or a D-subminiature (D-sub) 278. The interface 270 may be included in for example the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert, e.g., a sound signal into an electrical signal and vice versa. At least a part of the audio module 280 may be included in for example the input/output interface 145 as shown in FIG. 1. The audio module 280 may process sound information input or output through e.g., a speaker 282, a receiver 284, an earphone 286, or a microphone 288.

The camera module 291 may be a device for capturing still images and videos, and may include, according to an embodiment of the present disclosure, one or more image sensors (e.g., front and back sensors), a lens, an image signal processor (ISP), or a flash such as an LED or xenon lamp. According to an embodiment of the present disclosure, the camera module 291 may include the whole or part of the camera module 180.

The power manager module 295 may manage power of the electronic device 201, for example. According to an embodiment of the present disclosure, the power manager module 295 may include a power management Integrated circuit (PMIC), a charger IC, or a battery or fuel gauge. The PMIC may employ a wired and/or wireless recharging scheme. The wireless charging scheme may use for example, magnetic resonance charging, magnetic induction charging, or electromagnetic wave based charging. In this case, additional circuits, such as a coil loop, a resonance circuit, a rectifier, or the like may be needed for wireless charging. The battery gauge may measure the remaining power left in the battery 296, or the voltage, current, and temperature of the battery 296 while the battery 296 is being charged. The battery 296 may be a rechargeable battery or a solar battery.

The indicator 297 may indicate a particular state of the electronic device 201 or a part (e.g., the processor 210) of the electronic device, including e.g., when the electronic device is booting, has received a message, or is recharging. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or MediaFlo™ standards. Each of the aforementioned components of the electronic device may include one or more parts, and the names of the parts may vary depending on the type of the electronic device. According to various embodiments, the electronic device (e.g., the electronic device 201) may exclude some elements or include more elements, or some of the elements may be combined into a single component that may perform the same function as by the elements prior to the combination.

Figure 2B:
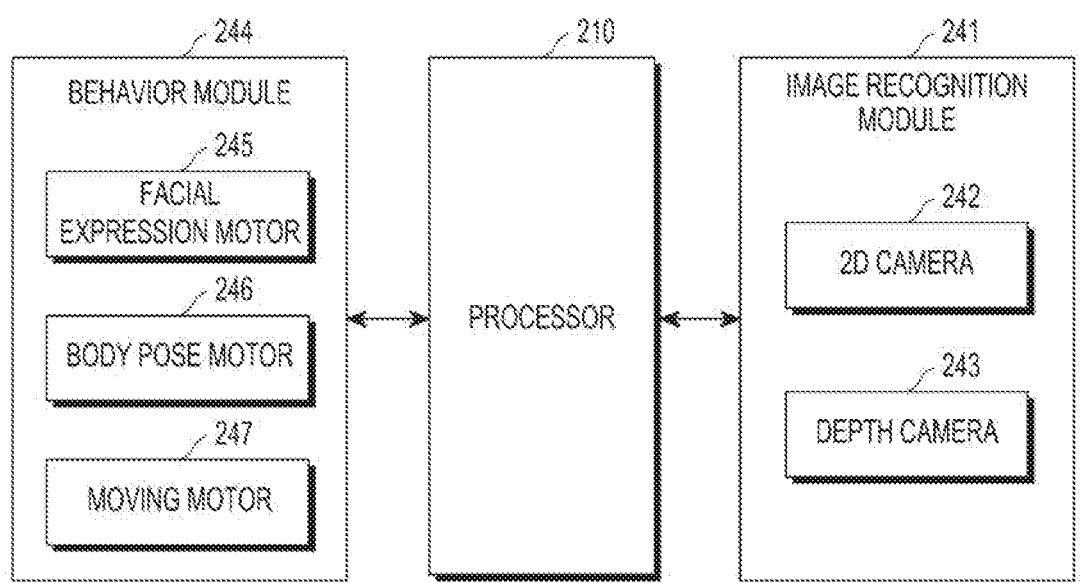
FIG. 2B is a block diagram illustrating an electronic device according to an embodiment of the present disclosure.

FIG. 2B is a block diagram illustrating an electronic device according to an embodiment of the present disclosure. As shown in FIG. 2b, the processor 210 may be connected with an image recognition module 241. The processor 210 may also be connected with a behavior module 244. The image recognition module 241 may include a 2-dimensional (2D) camera 242 and/or a depth camera 243. The image recognition module 241 may perform recognition based on the captured images and transfer the recognized result to the processor 210. The behavior module 244 may include a facial expression motor 245, a body pose motor 246, and/or a moving motor 247. The processor 210 may control the facial expression motor 245, the body pose motor 246, and/or the moving motor 247 to control the movement of the electronic device 101 when it is implemented as a robot. The electronic device 101 may include the elements shown in FIG. 2b in addition to the elements shown in FIG. 2a.

According to an embodiment of the present disclosure, an electronic device may comprise a camera, at least one motor, a communication interface, at least one processor, and a memory electrically connected with the processor, wherein the memory may store commands that, when executed by the processor, cause the processor to identify a motion of an external object using a first image obtained by controlling the camera, obtain first direction information based on the identified motion of the external object, drive the at least one motor so that the camera faces a direction determined according to the first direction information, and identify a second electronic device from a second image obtained by controlling the camera facing the determined direction.

According to an embodiment of the present disclosure, the memory may store commands that, when executed by the processor, cause the processor to transmit data corresponding to the second image to at least one server through the communication interface, receive data corresponding to the second electronic device determined based on the data corresponding to the second image from the at least one server, and identify the second electronic device based on the received data corresponding to the second electronic device.

According to an embodiment of the present disclosure, the memory may store commands that, when executed by the processor, cause the processor to receive at least one voice input, transmit data corresponding to the at least one voice input to at least one server through the communication interface, receive data corresponding to the second electronic device determined based on the data corresponding to the at least one voice input from the at least one server, and identify the second electronic device based on the received data corresponding to the second electronic device.

According to an embodiment of the present disclosure, the memory may store commands that, when executed by the processor, cause the processor to, when the second electronic device is determined to be a controllable electronic device, obtain data corresponding to the second electronic device from the memory, connect with the second electronic device through the communication interface using the obtained data, and control the second electronic device.

According to an embodiment of the present disclosure, the memory may store commands that, when executed by the processor, cause the processor to, when the data corresponding to the second electronic device is not in the memory, receive the data corresponding to the second electronic device from at least one server through the communication interface, and connect with the second electronic device using the data received from the at least one server.

According to an embodiment of the present disclosure, the memory may store commands that, when executed by the processor, cause the processor to store the obtained first direction information and the data corresponding to the second electronic device, which is received from the at least one server, in the memory.

According to an embodiment of the present disclosure, the memory may store commands that, when executed by the processor, cause the processor to receive at least one voice input, obtain a command related to control of the second electronic device from the at least one voice input, and transmit a signal corresponding to the obtained command to the second electronic device.

According to an embodiment of the present disclosure, the memory may store commands that, when executed by the processor, cause the processor to identify a state change in the second electronic device using a third image obtained by controlling the camera facing the direction, when the identified state change in the second electronic device does not correspond to the obtained command, output feedback corresponding to the at least one voice input.

According to an embodiment of the present disclosure, the memory may store commands that, when executed by the processor, cause the processor to output a request related to designation of a command corresponding to the second electronic device, store the obtained first direction information and a command corresponding to the request in the memory, and upon receiving at least one voice input including the command stored in the memory, transmit a signal corresponding to the command to the second electronic device.

According to an embodiment of the present disclosure, the memory may store commands that, when executed by the processor, cause the processor to, upon detecting a motion of the second electronic device, drive the at least one motor to trace the motion of the second electronic device, obtain second direction information about the second electronic device based on a result of tracing the motion of the second electronic device, and store the obtained second direction information in the memory.

Figure 3:
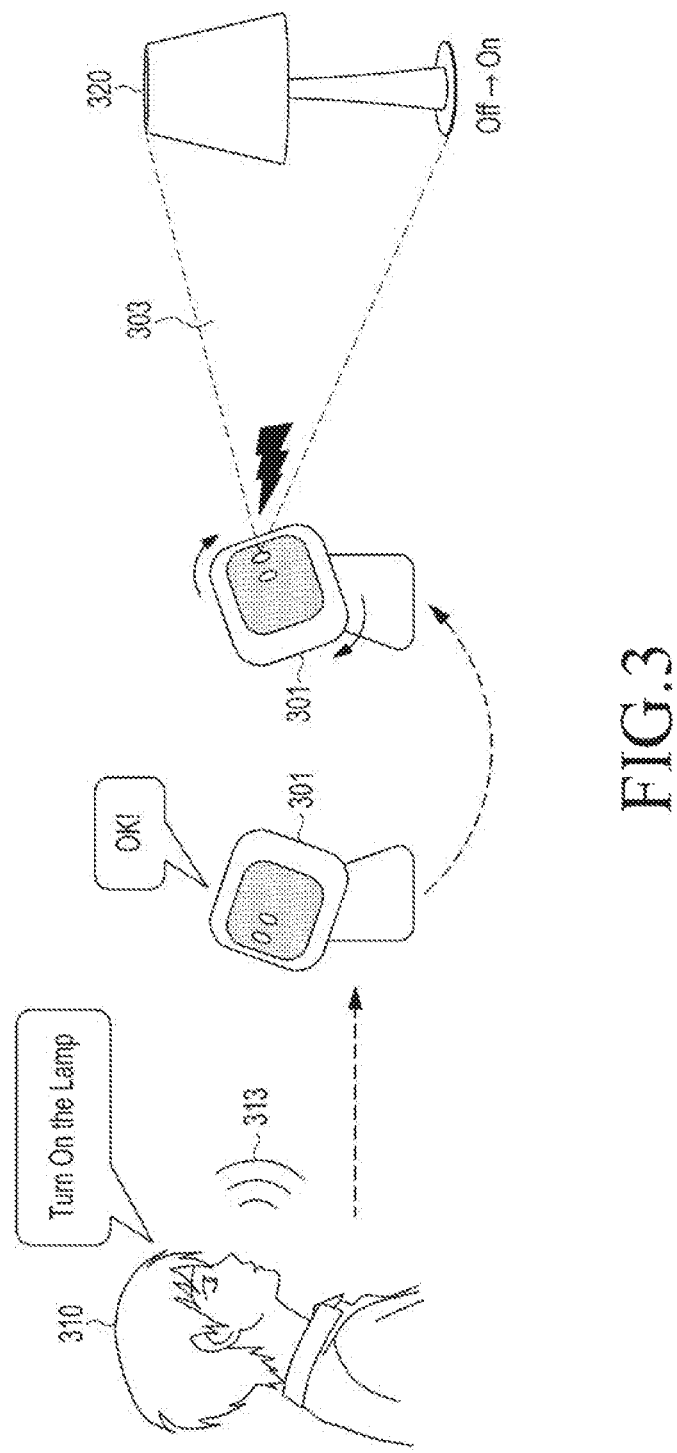
FIG. 3 is a view illustrating a method for controlling an electronic device using another electronic device according to an embodiment of the present disclosure.

FIG. 3 is a view illustrating a method for controlling an electronic device using another electronic device according to an embodiment of the present disclosure. According to an embodiment of the present disclosure, an electronic device 301 may include the whole or part of the electronic device 101 of FIGS. 1A and 1B.

Referring to FIG. 3, a user 310 of the electronic device 301 may control an object 320, e.g., a smart lamp, through the electronic device 301. The electronic device 301 may obtain information related to the object 320 using a camera (e.g., the camera module 180 or 291) or input/output interface (e.g., the input/output interface 150 of FIG. 1A or the input device 250 of FIG. 2A) provided in the electronic device 301.

According to an embodiment of the present disclosure, the electronic device 301 may obtain at least one image corresponding to the user 310 through the camera of the electronic device 301. The electronic device 301 may detect a motion of the user 310 using the at least one image obtained corresponding to the user 310. The electronic device 301 may obtain at least one piece of direction information based on the detected motion of the user 310. For example, the electronic device 301 may obtain at least one piece of direction information based on the motion of the user 310 pointing at least one of his or her body parts in a particular direction. For example, the electronic device 301 may detect the motion of the user 310 pointing his or her finger in a particular direction and may obtain at least one piece of direction information corresponding thereto. In another example, the electronic device 301 may detect the motion of the user 310 pointing his or her eyes or head in a particular direction and may obtain at least one piece of direction information corresponding thereto.

Thus, the user 310 of the electronic device 301 may perform the motion of pointing to the object 320 which he or she desires to control, and the electronic device 301 may detect the motion of the user 310 through the camera. The electronic device 301 may obtain at least one piece of direction information related to the object 320 based on the detected motion of the user 310. The electronic device 301 may determine the position of the object 320 based on the at least one piece of direction information obtained. For example, the electronic device 301 may determine a relative position of the object 320 based on the relative positions of a plurality of objects identified through the camera and the direction information obtained. The electronic device 301 may determine an absolute position of the object 320 based on coordinate information about a preset reference point and the direction information obtained.

According to an embodiment of the present disclosure, the electronic device 301 may obtain at least one image containing information related to the object 320 through the camera of the electronic device 301. The electronic device may identify the information related to the object 320 in the obtained image. For example, the electronic device 301 may capture an image by which the shape, model name, or position of the object 320 may be identified through the camera of the electronic device 301. Alternatively, the electronic device 301 may capture an image of a barcode or QR code that identifies the object 320. Thus, the electronic device 301 may identify information of the object 320, e.g., shape, model name, or position of the object 320, from the obtained image.

The electronic device 301 may receive at least one input containing the information related to the object 320 through an input/output interface provided in the electronic device 301. The electronic device 301 may identify the information related to the object 320 from at least one input received. For example, the electronic device 301 may receive at least one input containing the information for identifying the object 320, such as the shape, model name, or position of the object 320, through the input/output interface of the electronic device 301 and extract this information. The electronic device 301 may be activated when a predesignated voice input is received. For example, the activated electronic device 301 may receive a voice input 313 dictating "turn on the lamp," from the user 310. The electronic device 301 may recognize that the object 320 corresponds to the received voice input 313. The electronic device 301 may output a voice dictating "Ok!" when the object 320 is recognized.

The electronic device 301 may recognize the object 320 based on information obtained from other devices. For example, to recognize the object 320, the electronic device 301 may transmit the obtained information through a communication interface (e.g., the communication interface 170 of FIG. 1 or the communication module 220 of FIG. 2) to one or more servers. The electronic device 301 may then receive at least one piece of information necessary to recognize the object 320 from the one or more servers. The electronic device 301 may then recognize the object 320 based on the information received from the one or more servers. For example, the electronic device 301 may receive images of the object 320 captured at various angles. The electronic device 301 may recognize the object 320 using these images.

The electronic device 301 may move at least part of the electronic device 301 or reposition the electronic device 301 through a driver (e.g., the driver 191) provided in the electronic device 301 to locate the recognized object 320. For example, the driver may be provided in a portion inside or outside a head portion (e.g., the head portion 190) or body portion (e.g., the body portion 193) of the electronic device or may be provided where the head portion and the body portion connect together. The driver may include at least one motor. The electronic device 301 may activate at least one motor to move at least part of the electronic device 301 or reposition the electronic device 301. The electronic device 301 may redirect the camera of the electronic device 301 by moving the head portion (e.g., the head portion 190), which includes the camera. For example, the electronic device 301 may redirect the camera of the electronic device 301 in a first direction based on the direction information obtained from the user. The electronic device 301 may obtain at least one image corresponding to the first direction and may locate the object 320 using the obtained image.

Where the object 320 is identified from the image corresponding to the first direction, the electronic device 301 may determine whether the identified object 320 is positioned at the center of the image. If not, the electronic device 301 may reposition the camera (i.e. reposition the head portion 190) so that the identified object 320 is at the center of the image obtained through the camera.

If the object 320 is not identified from the image corresponding to the first direction, the electronic device 301 may redirect the camera in a second direction. The electronic device 301 may obtain at least one image corresponding to the second direction through the camera and may locate the object 320 using the image in the second direction. The electronic device 301 may repeatedly redirect the camera until the object 320 is identified.

According to an embodiment of the present disclosure, the electronic device 301, after locating the object 320 through the camera, may output feedback content 303 in the direction of the object. For example, where the object 320 is identified from at least one image obtained through the camera, the electronic device 301 may output light using a flashlight or its display, a sound using a speaker, or a vibration using a vibration motor.

The electronic device 301 may generate a control signal corresponding to at least one motion of the user 310 and a voice input received from the user 310. The electronic device 301 may transmit the generated control signal through the communication interface of the electronic device 301 to the object 320. Upon receiving the control signal generated by the electronic device 301, the object 320 may perform the function required by the received control signal. For example, a lamp, upon receipt of a control signal corresponding to "turn on the lamp," may turn on.

The electronic device 301 may identify that the object 320 has performed the function required by the control signal through the camera. For example, the electronic device 301, which has sent a control signal corresponding to "turn on the lamp" to the lamp 320, may identify whether the lamp 320 turns on through the camera. For example, the electronic device 301 may obtain at least one image containing the lamp 320 through a camera that faces the lamp 320. The electronic device 301 may then identify whether the lamp 320 has turned on by analyzing the obtained image.

Figure 4:
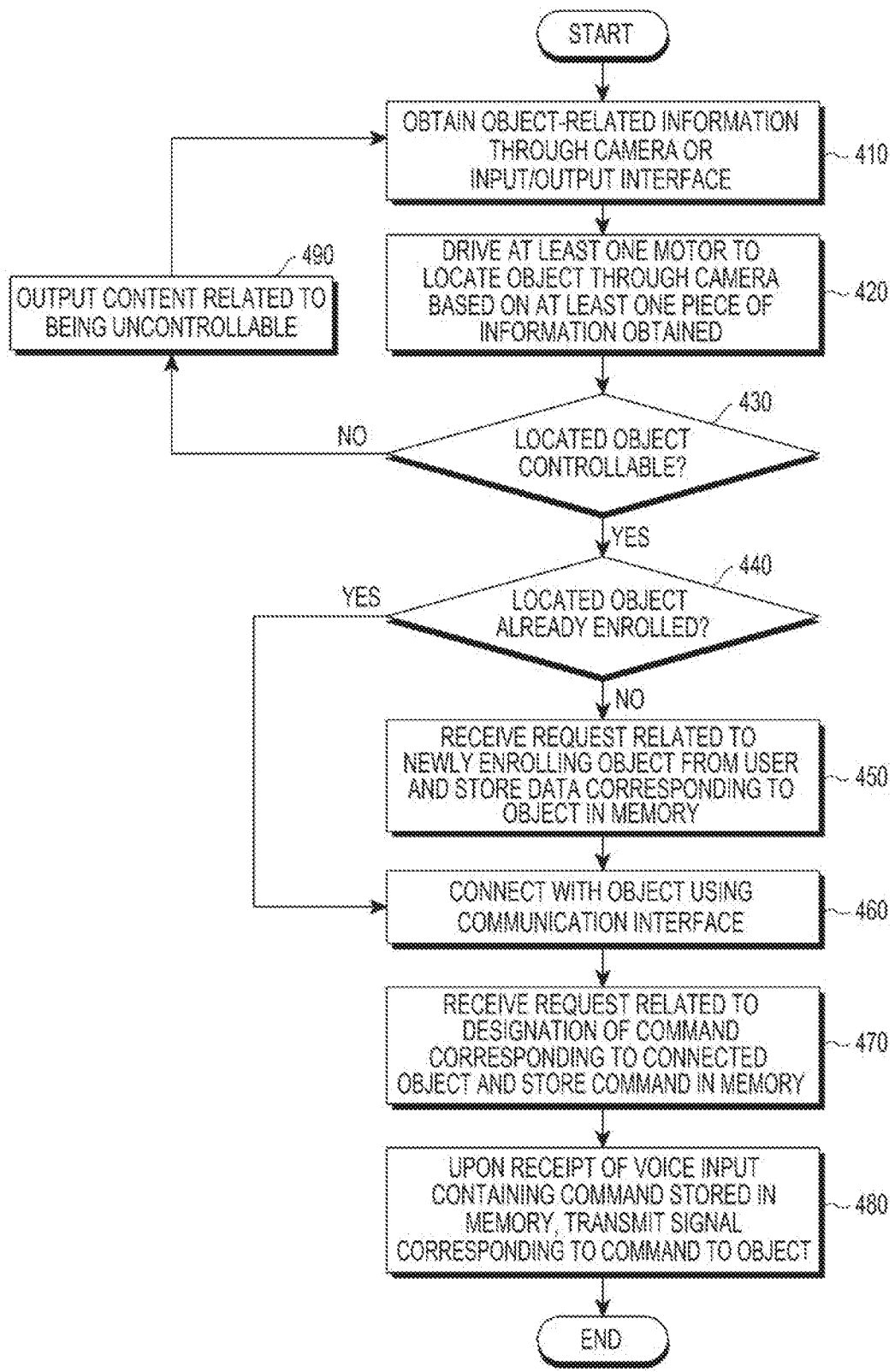
FIG. 4 is a flowchart illustrating a method for enrolling an object to be controlled using an electronic device according to an embodiment of the present disclosure.

FIG. 4 is a flowchart illustrating a method for enrolling an object to be controlled using an electronic device according to an embodiment of the present disclosure.

An electronic device (e.g., the electronic device 101 or 201) for performing this method may include a camera (e.g., the camera module 180 or 291), an input/output interface (e.g., the input/output interface 150 of FIG. 1A or the input device 250 of FIG. 2A), at least one motor, a communication interface (e.g., the communication interface 170 of FIG. 1A or the communication module 220 of FIG. 2A), and a processor (e.g., the processor 120 or 210). Among the components of the electronic device, the processor may perform the method.

Referring to FIG. 4, the processor may obtain information related to an object through the camera or the input/output interface in operation 410. For example, the processor may control the camera to obtain at least one image of the user. The processor may detect the user's motion using the obtained image. The processor may obtain at least one piece of direction information related to the object based on the detected user motion. The processor may recognize the object based on the at least one piece of direction information obtained.

The processor may control the camera to obtain at least one image including object-related information. The processor may identify the object-related information from the at least one image obtained. The processor may recognize the object based on the identified information. For example, the processor may identify information for identifying the object, e.g., the shape, model name, or position of the object, from the obtained image. The processor may recognize the object by comparing the identified information with information stored in the memory of the electronic device or a database of one or more servers.

The processor may receive at least one input including object-related information through the input/output interface. The processor may identify the object-related information from the input received. The processor may recognize the object based on the identified information. For example, the processor may identify information for identifying the object, e.g., the shape, model name, or position of the object, from the input received. The processor may recognize the object by comparing the identified information with information stored in the memory of the electronic device or a database of one or more servers.

For example in operation 420, the processor may activate at least one motor to locate the object through the camera. In particular, the processor may recognize the object based on information obtained through the camera or input/output interface. The processor may use the at least one piece of direction information obtained in step 410 and may activate at least one motor provided in the electronic device based on the at least one piece of direction information obtained in step 410. As such, the camera may be redirected in a direction corresponding to the at least one piece of direction information obtained in step 410. The processor may control the redirected camera to obtain at least one image, and the processor may locate the recognized object using at least one image obtained.

In operation 430, the processor may determine whether the object located through the camera is a controllable object. For example, to determine whether the object is controllable, the processor may identify whether the object located through the camera is included in a list of controllable objects that is stored in the memory of the electronic device or a database of one or more servers. Alternatively, the processor may attempt to connect to the object through the communication interface of the electronic device to determine whether the object is a controllable one.

Upon determining that the object is uncontrollable, the processor may perform operation 490. In operation 490, the processor may output content related to the object being uncontrollable. For example, the processor may output a voice speaking, "this object cannot be controlled," through the speaker of the electronic device. According to another embodiment, the processor may display the content instead through the display of the electronic device. According to an embodiment of the present disclosure, the processor may confirm whether the object is the object that the user intends to control by outputting a voice speaking "do you want to control this object?"

Upon determining that the object is controllable, the processor may perform operation 440. In operation 440, the processor may determine whether the object located through the camera is one already enrolled (i.e., registered as a device that can be controlled by the electronic device). For example, the processor may identify information stored in the memory of the electronic device or a database of one or more databases to determine whether the object is one already enrolled.

If the object is determined not to have been enrolled yet, the processor may perform operation 450. In operation 450, the processor may receive a request for newly enrolling the object from the user and store data corresponding to the object in the memory. For example, the processor may output content inquiring whether to newly enroll the object. For example, the processor may output a voice speaking, "do you want to enroll this object? Upon receiving a request for new enrollment of the object from the user, the processor may obtain data necessary to establish connection with the object from one or more servers and store the obtained data in the memory of the electronic device. Also, upon receiving a request for new enrollment of the object from the user, the processor may store position information about the object obtained through the camera or the input/output interface in the memory of the electronic device.

When the object is determined to have already been enrolled or new enrollment is accomplished, the processor may perform operation 460. In operation 460, the processor may establish a connection with the object through the communication interface of the electronic device.

In operation 470, the processor may send a request related to designation of a command corresponding to the connected object and store the command in the memory of the electronic device. For example, where the connection with the object is established through the communication interface, the processor may output content inquiring whether to designate command(s) corresponding to the connected object. For example, the processor may output a voice speaking, "do you want to set a command corresponding to this object?" The processor may receive at least one command corresponding to the connected object from the user and store the received command in the memory of the electronic device or a database of the one or more servers.

In operation 480, upon receipt of a command-containing input, the processor may transmit a signal corresponding to the received command to the object. For example, upon receiving an input that corresponds to a command stored in the memory of the electronic device or a database of the one or more servers, the processor may generate a signal corresponding to the stored command. The processor may transmit the generated signal through the interface to the object. For example, the processor may receive a voice input speaking, "turn on the lamp," generate a signal corresponding thereto, and transmitting the signal through the communication interface to the object. Upon receipt of the signal, the object, e.g., lamp, may turn on.

Operations 410 to 490 are provided for the purposes of describing embodiments of the present disclosure, and operations 410 to 490 are not necessarily performed sequentially nor are all of the operations necessary. For example, only some of the operations may be performed.

Figure 5A:
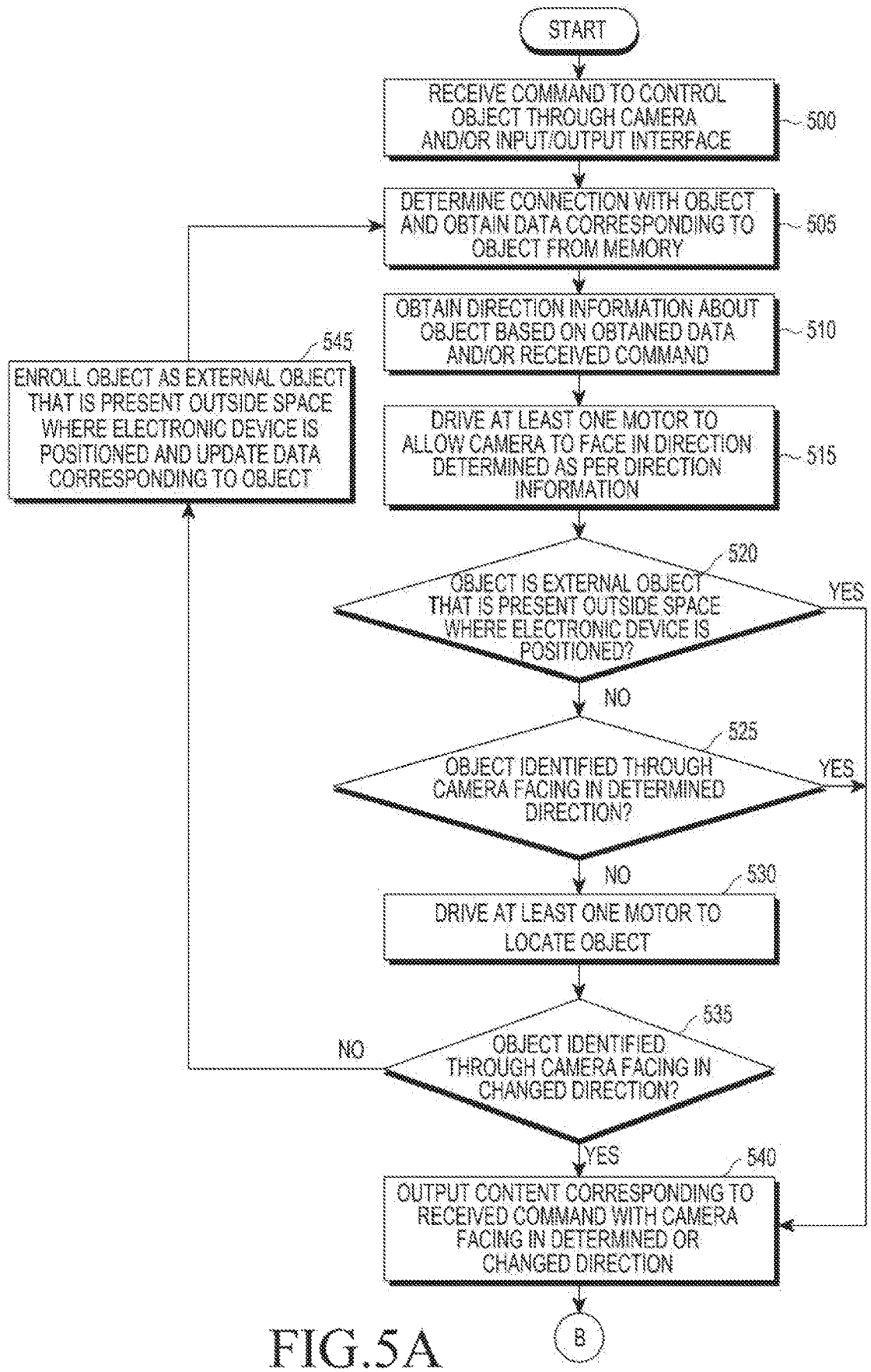
FIG. 5A is a flowchart illustrating a method for controlling at least one object using an electronic device according to an embodiment of the present disclosure.

FIG. 5A is a flowchart illustrating a method for controlling at least one object using an electronic device according to an embodiment of the present disclosure.

An electronic device (e.g., the electronic device 101 or 201) for performing this method may include a camera (e.g., the camera module 180 or 291), an input/output interface (e.g., the input/output interface 150 of FIG. 1A or the input device 250 of FIG. 2A), at least one motor, a communication interface (e.g., the communication interface 170 of FIG. 1A or the communication module 220 of FIG. 2A), and a processor (e.g., the processor 120 or 210). Among the components of the electronic device, the processor may perform the method.

Referring to FIG. 5A, the processor may receive a command to control an object through the camera or input/output interface in operation 500. For example, the processor may control the camera to obtain at least one image of the user. The processor may detect the user's motion using the obtained image. The processor may recognize an object to be controlled based on the detected user motion. For example, the processor may detect the user's motion of pointing her finger to the object. The processor may also recognize the object based on the user's voice input that is received through the input/output interface. For example, corresponding to receiving a sound input speaking "turn on the lamp on your left," the processor may recognize the lamp relatively positioned on the left of the electronic device is the object to be controlled.

In operation 505, the processor may determine whether a connection with the object is established and obtain data corresponding to the object from the memory. The processor may determine whether a connection with the recognized object has been established. Upon determining that no connection is established with the recognized object, the processor may obtain information necessary to establish a connection with the recognized object from the memory of the electronic device or a database of one or more servers. The processor may then establish a connection with the recognized object based on the obtained information. Upon determining that a connection has been established with the recognized object, the processor may obtain data corresponding to the recognized object from the memory of the electronic device or a database of one or more servers.

In operation 510, the processor may obtain direction information about the recognized object based on at least one of data items obtained in operation 505 and the command received in operation 500. For example, the processor may obtain the direction information about the recognized object based on the user's motion that is obtained via the camera. Alternatively, the processor may obtain the direction information about the recognized object based on data obtained from the memory of the electronic device or database of one or more servers.

In operation 515, the processor may activate at least one motor so that the camera faces the direction determined by the obtained direction information. For example, the camera of the electronic device may be provided in a portion of the electronic device, e.g., a head portion (e.g., the head portion 190) of the electronic device. The processor may activate at least one motor included in a driver (e.g., the driver 191) of the electronic device to move the head portion of the electronic device. As the head portion of the electronic device moves, the camera of the electronic device may be redirected. According to an embodiment of the present disclosure, the obtained direction information may include information corresponding to the position of the recognized object. The processor may drive at least one motor to allow the camera to face the direction determined by the obtained direction information so that the camera of the electronic device faces the recognized object.

In operation 520, the processor may determine whether the recognized object is an external object that is present outside the space where the electronic device is positioned. For example, when the recognized object is not in the space where the electronic device is positioned, the processor may have difficulty in locating the object through the camera.

When the recognized object is outside the space where the electronic device is positioned, the processor may perform operation 540.

If the recognized object is within the space where the electronic device is positioned, the processor may perform operation 525. In operation 525, the processor may determine whether the recognized object is identified through the camera facing the determined direction. For example, the processor may control the camera to obtain at least one image in the determined direction. The processor may then identify at least one object in the at least one image. The processor may determine whether the at least one object identified is the same as the recognized object. When the recognized object is identified through the camera facing the determined direction, the processor may perform operation 540.

But if the recognized object is not identified through the camera facing the determined direction, the processor may perform operation 530. In operation 530, the processor may drive at least one motor to locate the recognized object. For example, the processor may drive at least one motor to redirect the camera.

In operation 535, the processor may determine whether the recognized object is identified through the camera facing the changed direction. For example, the present disclosure may control the camera facing the changed direction to obtain at least one image in the changed direction. The processor may then identify at least one object in the at least one image. The processor may determine whether the at least one object identified is the same as the recognized object. According to an embodiment of the present disclosure, operations 530 through 535 may be repeated until the recognized object is identified or until scanning of the space where the electronic device is positioned is complete.

If the recognized object is not identified through the camera facing in the changed direction, the processor may perform operation 545. In operation 545, the processor may enroll the recognized object as an external object which is present outside the space where the electronic device is positioned, and the processor may update the data corresponding to the object. For example, upon failing to identify the recognized object despite omni-directional scanning of the space where the electronic device is positioned using the camera, the processor may determine that the recognized object is an external object which is present outside the space where the electronic device is positioned. Based on this determination, the processor may update the position data stored in the memory of the electronic device or database of one or more servers.

When the recognized object is identified through the camera facing the changed direction the processor may perform operation 540. In operation 540, the processor may output content corresponding to a received command, with the camera positioned to face the determined or changed direction. For example, when operation 540 is performed after operation 520, the processor may abstain from driving at least one motor and only output content corresponding to the received command. In this case, the content corresponding to the received command may be content output corresponding to transmission, to the recognized object, of a signal corresponding to the received command. For example, the processor may output visual content using the flashlight or display of the electronic device, sound using the speaker of the electronic device, or vibration using a vibration motor of the electronic device.

In another example, when operation 540 is performed after operation 525, the processor may output the content corresponding to the received command, with the camera positioned to face the determined direction. Where operation 540 is performed after operation 535, the processor may output the content corresponding to the received command, with the camera positioned to face the changed direction. In this case, the content corresponding to the received command may be feedback content output in the direction of the recognized object after the recognized object has been located through the camera. For example, the processor may output visual content using the flashlight or display of the electronic device, sound using the speaker of the electronic device, or vibration using a vibration motor of the electronic device.

Figure 5B:
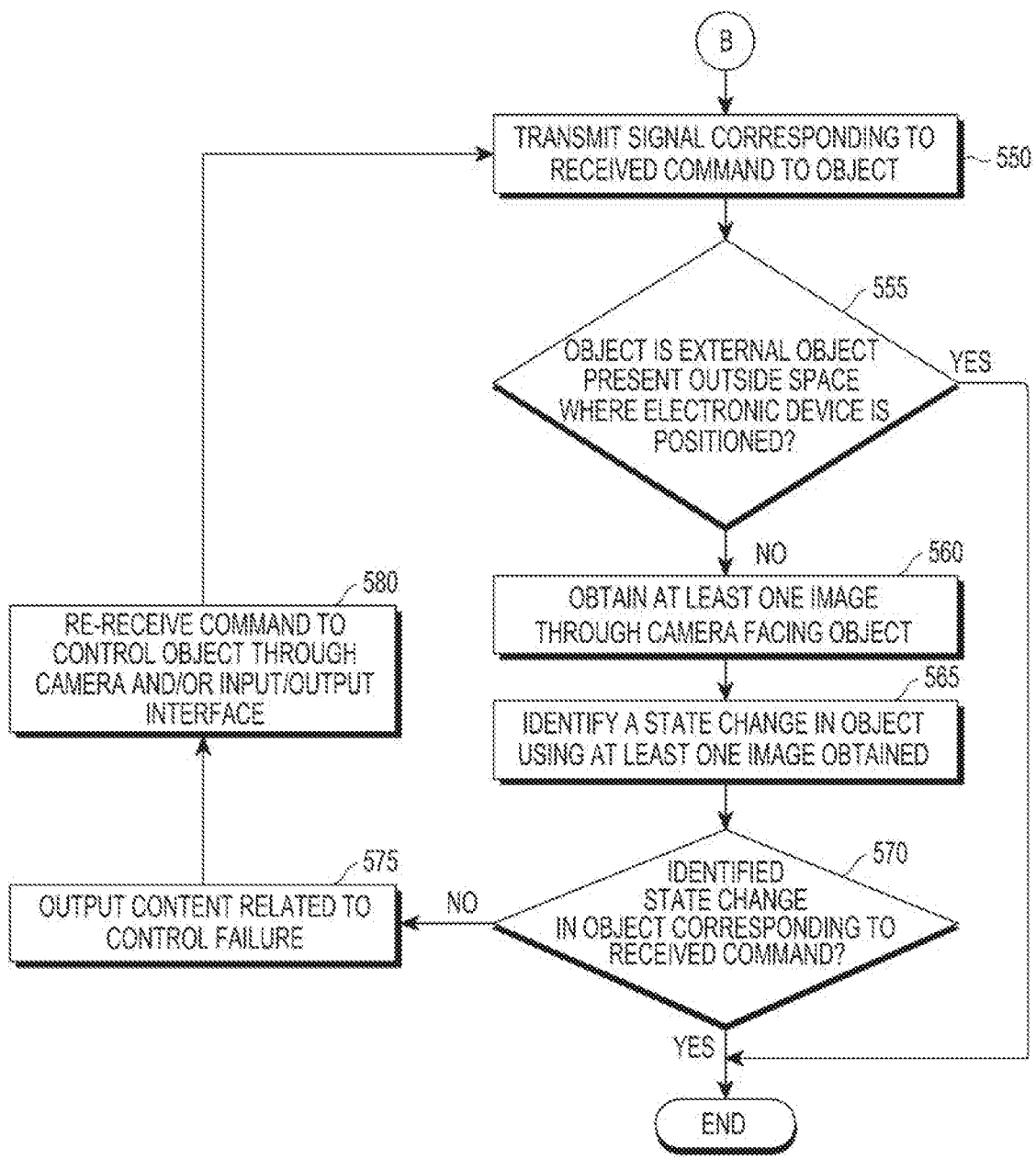
FIG. 5B is a flowchart illustrating a method for identifying a result of controlling at least one object using an electronic device according to an embodiment of the present disclosure.

FIG. 5B is a flowchart illustrating a method for identifying a result of controlling at least one object using an electronic device according to an embodiment of the present disclosure.

An electronic device (e.g., the electronic device 101 or 201) for performing this method may include a camera (e.g., the camera module 180 or 291), an input/output interface (e.g., the input/output interface 150 of FIG. 1A or the input device 250 of FIG. 2A), at least one motor, a communication interface (e.g., the communication interface 170 of FIG. 1A or the communication module 220 of FIG. 2A), and a processor (e.g., the processor 120 or 210). Among the components of the electronic device, the processor may perform the method.

According to an embodiment of the present disclosure, the processor of the electronic device may perform the operations of FIG. 5B after performing the operations of FIG. 5A. Upon receipt of a command for controlling an object through the camera or input/output interface, the processor of the electronic device may perform the operations of FIG. 5B.

Referring to FIG. 5B, the processor may transmit a signal corresponding to the received command to the object in operation 550. For example, the processor may receive a command to control the object through the camera or input/output interface. The processor may generate a signal corresponding to the received command and transmit the generated signal through the communication interface to the object.

In operation 555, the processor may determine whether the object is an external object that is present outside the space where the electronic device is positioned. For example, when the object is present outside the space where the electronic device is positioned, the processor may have difficulty in identifying state changes in the object through the camera. When the object is present outside the space where the electronic device is positioned, the processor may perform no additional operation.

But if the object is within the space where the electronic device is positioned, the processor may perform operation 560. In operation 560, the processor may control the camera facing towards the object to obtain at least one image. For example, upon receiving a command to control the object, the processor may obtain direction information about the object. The processor may obtain the direction information about the object based on the user's motion and the data obtained from the memory of the electronic device or database of one or more servers. The processor may determine the position of the object according to the obtained direction information and drive at least one motor of the electronic device based on a result of the determination to redirect the camera of the electronic device. By so doing, the processor may control the camera to face the object.

In operation 565, the processor may identify a state change in the object using at least one image obtained. For example, the present disclosure may control the camera facing towards the object to obtain at least one image. By analyzing the at least one image obtained, the processor may identify a state change in the object. For example, the processor may identify that the object has turned on in response to a "turn on" command.

In operation 570, the processor may determine whether the identified state change in object is a state change corresponding to the received command. The processor may compare an image of the object obtained before transmitting the signal corresponding to the received command with an image of the object obtained afterwards. For example, the processor may receive a voice input speaking, "turn on the lamp." The processor may identify that the object, i.e. the lamp, is off before sending the signal. The processor may also identify that the object turned on after sending the signal. In this way, the processor may determine whether the identified state change in the object is a state change corresponding to the received command.

If the identified state change in the object is not a state change corresponding to the received command, the processor may perform operation 575. In operation 575, the processor may output content related to a control failure. For example, the processor may output a voice speaking, "failed to control the object," through the speaker of the electronic device. Alternatively, the processor may display content related to the failure to control through the display of the electronic device.

In operation 580, the processor may re-receive a command to control the object through the camera or input/output interface. For example, after outputting the content related to the failure to control, the processor may re-receive a command to control the object from the user. The processor may re-perform at least one of operations 550 to 580 based on the re-received command.

Figure 6:
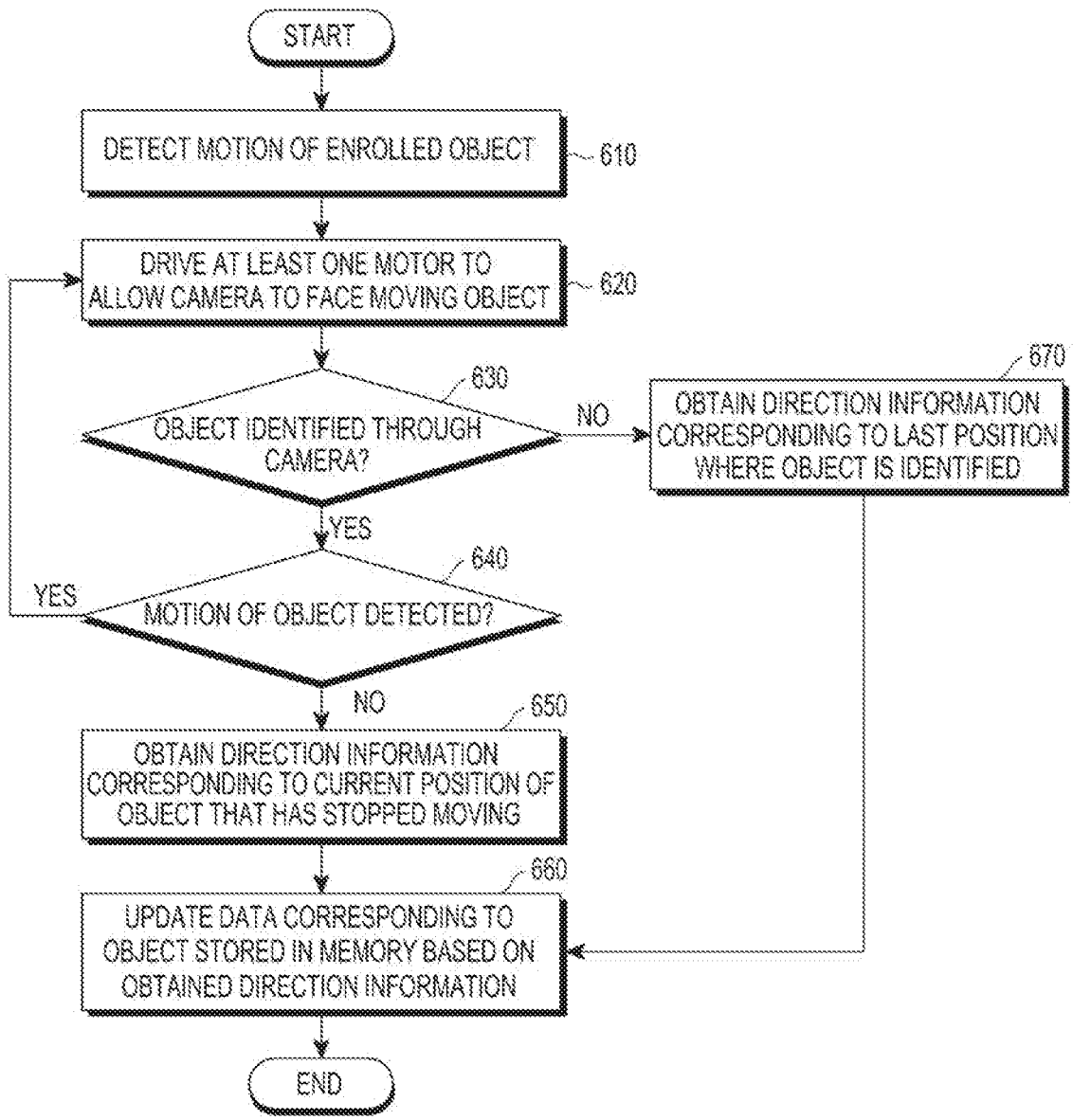
FIG. 6 is a flowchart illustrating a method for identifying an object that is repositioned using an electronic device according to an embodiment of the present disclosure.

FIG. 6 is a flowchart illustrating a method for identifying an object that is repositioned using an electronic device according to an embodiment of the present disclosure.

An electronic device (e.g., the electronic device 101 or 201) for performing this method may include a camera (e.g., the camera module 180 or 291), an input/output interface (e.g., the input/output interface 150 of FIG. 1A or the input device 250 of FIG. 2A), at least one motor, a communication interface (e.g., the communication interface 170 of FIG. 1A or the communication module 220 of FIG. 2A), and a processor (e.g., the processor 120 or 210). Among the components of the electronic device, the processor may perform the method.

Referring to FIG. 6, the processor may detect a motion of an enrolled object in operation 610. For example, the processor may identify at least one object enrolled in the electronic device as an object to be controlled, using at least one image obtained by the camera. According to an embodiment of the present disclosure, to identify the positions or states of the enrolled objects, the processor may drive at least one motor provided in the electronic device to periodically change the direction in which the camera of the electronic device faces. The processor may then identify the positions or states of the enrolled objects using the images obtained by the camera pointing in various directions.

The processor may detect the motion of one or more of the enrolled objects by identifying, periodically or in real-time through the camera, the positions or states of the enrolled objects.

In operation 620, the processor may drive at least one motor to allow the camera to face a moving object. The processor may, in real-time, trace the moving object or identify the repositioned object based on images obtained by the camera. Alternatively, the processor may track the moving object using a sensor, e.g., a motion sensor or distance measuring sensor, provided in the electronic device. The processor may drive at least one motor provided in the electronic device so that the camera faces the moving object or the repositioned object.

In operation 630, the processor may determine whether the object is identified through the camera. For example, the processor may analyze at least one image obtained by the camera facing and determine whether the moving object or repositioned object is identified.

If the object is not identified through the camera, the processor may perform operation 670. In operation 670, the processor may obtain direction information corresponding to the last position where the object is identified. The position of the object may have been previously determined. However, due to its movement, the processor can no longer locate the object. For example, the object may have moved to be outside the space where the electronic device is positioned, such that the object may not be identified through the camera of the electronic device. The processor may enroll the object, which is no longer identified through the camera, as an external object. The processor may update pre-stored object position data based on direction information corresponding to the last position where the object is identified.

When the object is identified through the camera, the processor may perform operation 640. In operation 640, the processor may detect a motion of the identified object. For example, upon detecting the continuous motion of the identified object, the processor may re-drive the at least one motor to trace the moving object. The processor may repeat operations 620 to 640 until the object stops moving or is not identified any longer.

If the motion of the object is not detected, the processor may perform operation 650. In operation 650, the processor may obtain direction information corresponding to the current position where the object has stopped moving. For example, the processor may obtain the direction information corresponding to the current position of the object based on the degree at which the head portion (e.g., the head portion 190) of the electronic device has turned up or down or left or right. The processor may obtain the direction information corresponding to the current position of the object based on relative positions of one or more objects identified through the camera.

According to an embodiment of the present disclosure, the processor may generate a map corresponding to the space where the electronic device is positioned using the camera and at least one sensor (e.g., the sensor module 240) provided in the electronic device. The map may be generated using a 360-degree panoramic image captured of the space where the electronic device is positioned. The processor may map at least one set of coordinates to the generated map and may represent the positions of the objects identified in the map using the mapped set of coordinates. The processor may identify the current position of the object that has stopped moving on the generated map, and the processor may obtain the direction information corresponding to the identified position.

In operation 660, the processor may update data corresponding to the object, which is stored in the memory, based on the obtained direction information. For example, the processor may update the position data of the object based on the obtained direction information. Upon receiving a command to control the object after the update, the processor may drive at least one motor to allow the camera of the electronic device to face the direction corresponding to the updated position.

According to an embodiment of the present disclosure, the position of the electronic device (e.g., the electronic device 101 or 201) may be varied. For example, the electronic device may be repositioned by the user. The electronic device may be moved using at least one motor provided in the electronic device. Upon determining that the electronic device has been repositioned, the processor may use the camera, at least one sensor, input/output interface, or communication interface to identify the changed position.

For example, the processor may obtain at least one image by controlling the camera when its position has changed. The processor may identify the changed position of the electronic device based on the at least one image obtained. For example, the processor may compare at least one image obtained before the electronic device is repositioned with at least one image obtained after the electronic device is repositioned and identify the changed position by comparing the images. In doing so, the processor may identify an object that is commonly included in the image obtained before the electronic device is repositioned and the image obtained after the electronic device is repositioned, and the processor may identify the changed position of the electronic device based on the absolute or relative position of the identified object. Upon failing to identify an object commonly included in the image obtained before the electronic device is repositioned and the image obtained after the electronic device is repositioned, the processor may determine that the space where the electronic device is positioned has changed.

The processor may identify the changed position of the electronic device based on information received through at least one sensor, input/output interface, or communication interface. For example, the processor may obtain information about the changed position from the user through the input/output interface. Or, the processor may obtain the information about the changed position through the communication interface, e.g., the global positioning system (GPS). The processor may identify the changed position of the electronic device based on the information obtained through the input/output interface and the communication interface.

When the changed position of the electronic device is identified, the processor may identify one or more objects positioned around the electronic device through the camera of the electronic device. To that end, the processor may redirect the camera by using at least one motor of the electronic device. The processor may also generate a new map corresponding to the changed position. The map may be generated using a 360-degree panoramic image captured of the space where the electronic device is positioned. The processor may map at least one set of coordinates to the generated map and may represent the positions of the objects identified in the map using the mapped set of coordinates. The processor may identify the current positions of one or more objects whose relative positions have been changed due to the motion of the electronic device based on the generated map, and the processor may obtain direction information corresponding to the identified positions.

FIG. 7 are views illustrating a method for driving at least part of an electronic device according to an embodiment of the present disclosure.

An electronic device (e.g., the electronic device 101 or 201) for performing this method may include a camera (e.g., the camera module 180 or 291), an input/output interface (e.g., the input/output interface 150 of FIG. 1A or the input device 250 of FIG. 2A), at least one motor, a communication interface (e.g., the communication interface 170 of FIG. 1A or the communication module 220 of FIG. 2A), a sensor (e.g., the sensor 171), and a processor (e.g., the processor 120 or 210). Among the components of the electronic device, the processor may perform the method.

Figure 7A:
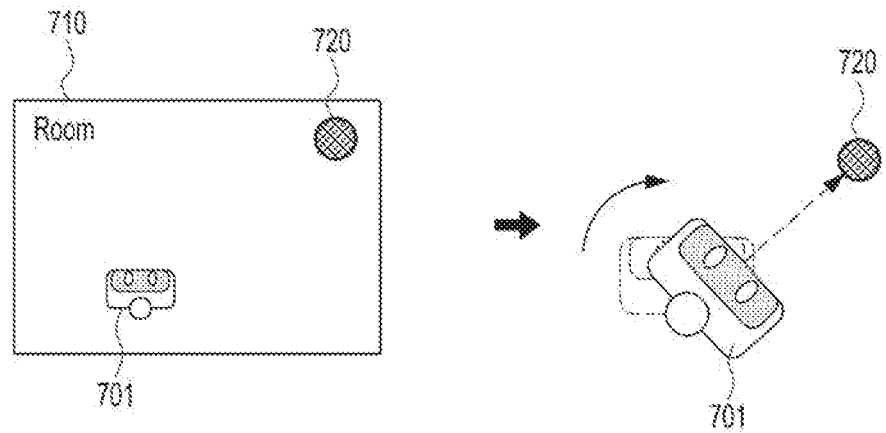
FIG. 7A, FIG. 7B and FIG. 7C are views illustrating a method for driving at least part of an electronic device according to an embodiment of the present disclosure.

FIG. 7A is a plan view of a particular space 710 where the electronic device 701 and an object 720 to be controlled are positioned. For example, the particular space 710 may mean a living room or bed room in a home.

According to an embodiment of the present disclosure, the processor may move at least part of the electronic device 701 using at least one motor provided in the electronic device 701. For example, a head portion (e.g., the head portion 190) of the electronic device 701 may include at least one of a camera and a sensor. The processor may drive at least one motor to move the head portion of the electronic device 701 to change the direction of the camera.

For example, the processor may receive a command to control the object 720 from the user. To identify the object 720 to be controlled through the camera, the processor may change the direction of the camera so that it faces the object 720. The processor may drive at least one motor to turn the head portion of the electronic device, thereby allowing the camera of the electronic device to face the object 720.

Figure 7B:
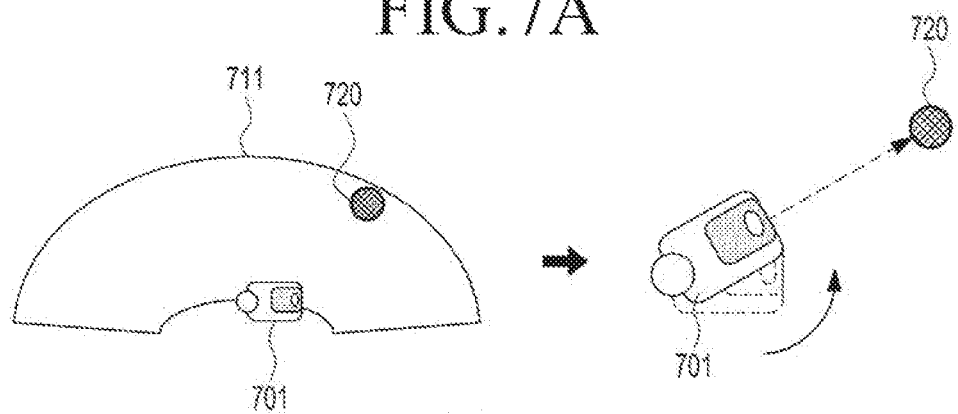

FIG. 7B illustrates a map 711 generated through the camera of the electronic device 701. The processor may generate the map 711 for the space 710 where the electronic device 701 is positioned using images obtained by the camera. The processor may define the map 711 using at least one reference point and coordinates corresponding to the reference point. The processor may identify the object 720 in the map 711, and the processor may identify the position of the identified object 720 based on the coordinates. The processor may store the map 711 and coordinate data corresponding to the map 711 in the memory of the electronic device or a database of one or more servers. Upon receipt of a command to control the object 720, the processor may identify the coordinates of the object 720 in the map 711, and the processor may drive at least one motor to allow the camera of the electronic device 701 to face the direction corresponding to the identified coordinates.

Figure 7C:
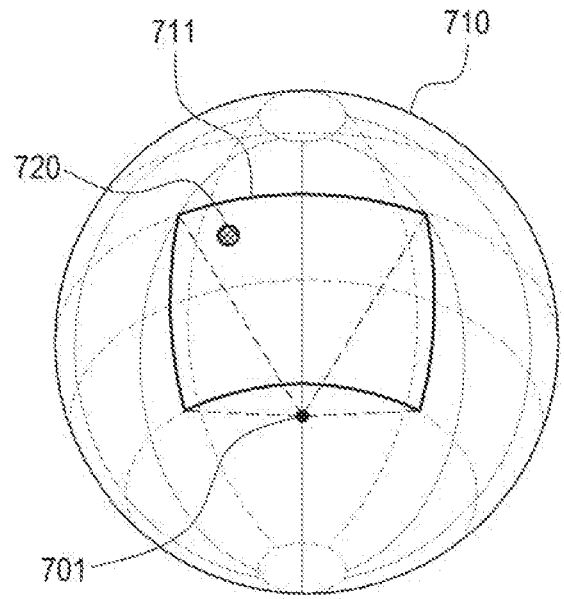

FIG. 7C illustrates an overall shape of the map 711 corresponding to the space 710 where the electronic device 701 is positioned. For example, the processor may configure the overall shape of the map 711 as a sphere. The processor may obtain at least one image corresponding to at least part of the space 710 by controlling the camera of the electronic device. The processor may identify the object 720 from the at least one image obtained. The map 711 corresponding to the space 710 as shown in FIG. 7C may be defined with absolute coordinates using the spherical coordinate system or relative coordinates with respect to the electronic device 701.

Figure 8:
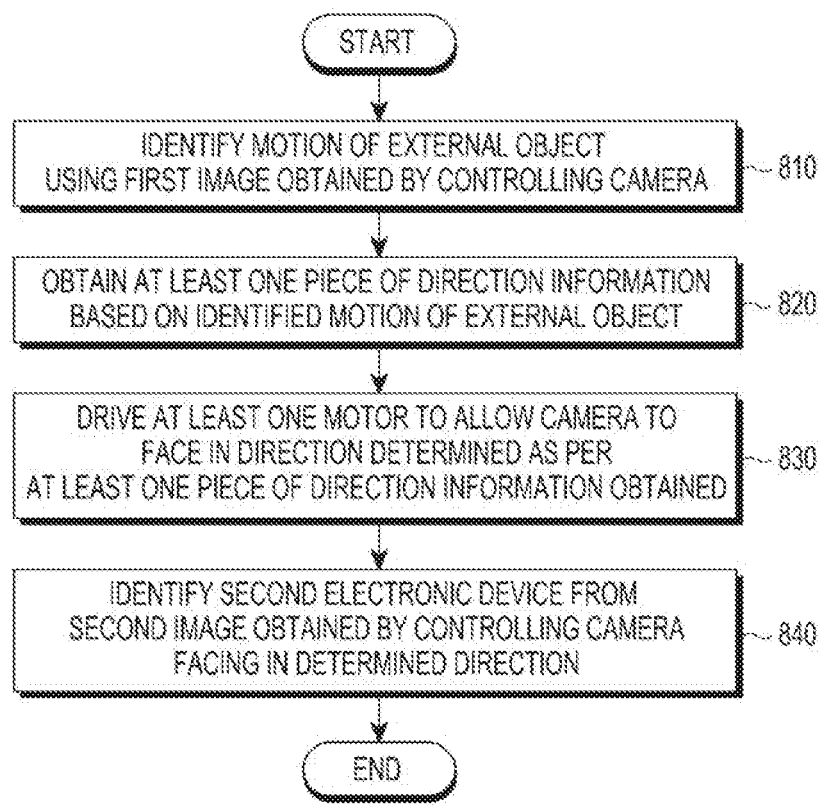
FIG. 8 is a flowchart illustrating a method for controlling an electronic device according to an embodiment of the present disclosure.

FIG. 8 is a flowchart illustrating a method for controlling an electronic device according to an embodiment of the present disclosure.

An electronic device (e.g., the electronic device 101 or 201) for performing this method may include a camera (e.g., the camera module 180 or 291), an input/output interface (e.g., the input/output interface 150 of FIG. 1A or the input device 250 of FIG. 2A), at least one motor, a communication interface (e.g., the communication interface 170 of FIG. 1A or the communication module 220 of FIG. 2A), and a processor (e.g., the processor 120 or 210). Among the components of the electronic device, the processor may perform the method.

Referring to FIG. 8, the processor may identify a motion of an external object using a first image obtained by controlling the camera in operation 810. Here, the first image may mean a single or multiple images obtained by the camera. For example, the processor may obtain a plurality of images corresponding to the external object. The processor may identify a motion of the external object using the plurality of images obtained. For example, the processor may identify the motion of the external object between a first time and a second time by comparing an image obtained at the first time with an image obtained at the second time.

In operation 820, the processor may obtain at least one piece of direction information based on the identified motion of the external object. For example, the processor may control the camera of the electronic device to obtain at least one image corresponding to the external object. Here, the external object may be the user of the electronic device. The processor may detect the user's motion using at least one image obtained corresponding to the user. The processor may obtain at least one piece of direction information based on the user's motion detected. For example, the processor may obtain at least one piece of direction information based on the user's motion pointing at least one body part in a particular direction. The processor may detect the user's motion pointing her finger in a particular direction and may obtain at least one piece of direction information corresponding thereto. The processor may detect the user's motion pointing her head or eyes in a particular direction and may obtain at least one piece of direction information corresponding thereto.

For example, the user may make the motion of pointing at least one body part to a second electronic device that the user wishes to control, and the processor may detect the user's motion through the camera. The processor may obtain at least one piece of direction information related to the second electronic device based on the detected user motion. The processor may determine the position of the second electronic device based on at least one piece of direction information obtained. For example, the processor may determine a relative position of the second electronic device based on a relative relationship in position among a plurality of objects identified through the camera and the at least one piece of direction information obtained. The processor may determine an absolute position of the second electronic device based on coordinate information about a preset reference point and the at least one piece of direction information obtained.

In operation 830, the processor may activate at least one motor so that the camera faces in the direction determined by the at least one piece of direction information obtained. For example, the processor may change the direction in which the camera of the electronic device faces by moving the head portion (e.g., the head portion 190) including the camera of the electronic device. The processor may change the direction in which the camera of the electronic device faces based on first direction information obtained in relation to the second electronic device. The processor may drive at least one motor to allow the camera of the electronic device to face in the direction determined as per the obtained first direction information.

In operation 840, the processor may identify the second electronic device from a second image obtained by controlling the camera facing in the determined direction. Here, the second image may mean a single or multiple images obtained through the camera. For example, the processor may identify the second electronic device from at least one image obtained by controlling the camera. When the second electronic device is identified from at least one image corresponding to the determined direction, the processor may determine whether the identified second electronic device is positioned at the center of the image obtained through the camera. The processor may adjust the direction in which the camera faces to place the identified second electronic device at the center of the image obtained through the camera.

If the second electronic device is not identified from at least one image corresponding to the determined direction, the processor may change the direction in which the camera faces. The processor may obtain at least one image corresponding to the changed direction by controlling the camera, and the processor may locate the second electronic device from at least one image obtained. The processor may repeat the operations of changing the direction in which the camera faces, obtaining an image corresponding to the changed direction, and locating the second electronic device using the obtained image until the second electronic device is identified.

Figure 9:
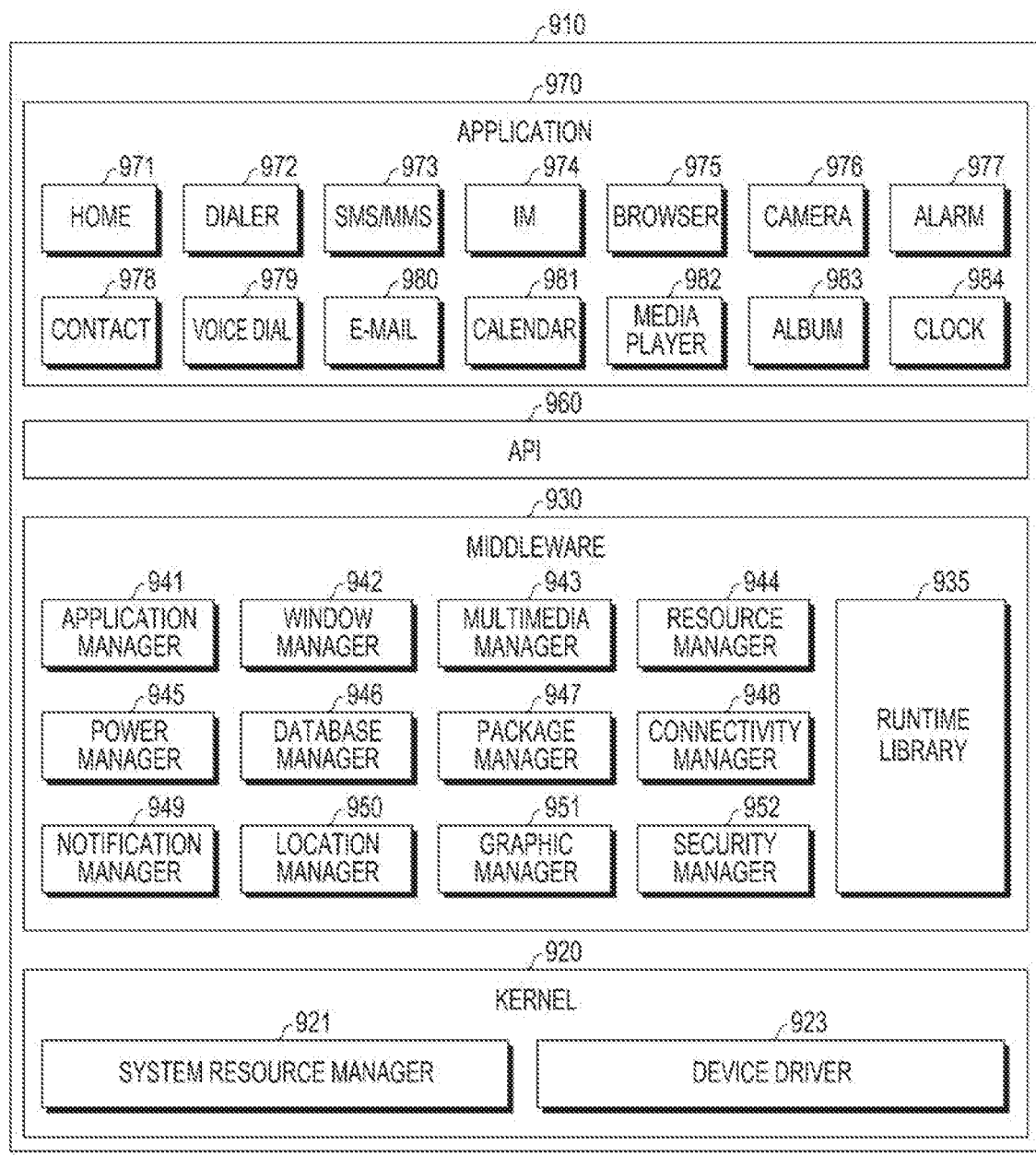
FIG. 9 is a block diagram illustrating a program module according to an embodiment of the present disclosure.

FIG. 9 is a block diagram illustrating a program module according to an embodiment of the present disclosure. According to an embodiment of the present disclosure, the program module 910 (e.g., the program 140) may include an operating system (OS) controlling resources related to the electronic device (e.g., the electronic device 101) and/or various applications (e.g., the application 147) driven on the operating system. The operating system may include, e.g., Android™, iOS™, Windows™, Symbian™, Tizen™, or Bada™.

Referring to FIG. 9, the program module 910 may include a kernel 920 (e.g., the kernel 141), middleware 930 (e.g., the middleware 143), an API 960 (e.g., the API 145), and/or an application 970 (e.g., the application program 147). At least a part of the program module 910 may be preloaded on the electronic device or may be downloaded from an external electronic device (e.g., the electronic devices 102 and 104 or server 106).

The kernel 920 may include, e.g., a system resource manager 921 or a device driver 923. The system resource manager 921 may perform control, allocation, or recovery of system resources. According to an embodiment of the present disclosure, the system resource manager 921 may include a process managing unit, a memory managing unit, or a file system managing unit. The device driver 923 may include, e.g., a display driver, a camera driver, a Bluetooth driver, a shared memory driver, a USB driver, a keypad driver, a Wi-Fi driver, an audio driver, or an inter-process communication (IPC) driver.

The middleware 930 may provide various functions to the application 970 through the API 960 so that the application 970 may use limited system resources in the electronic device or provide functions jointly required by applications 970. According to an embodiment of the present disclosure, the middleware 930 may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, or a security manager 952.

The runtime library 935 may include a library module used by a compiler in order to add new functions while, e.g., the application 970 is being executed. The runtime library 935 may perform input/output management, memory management, or arithmetic function processing.

The application manager 941 may manage the life cycle of, e.g., the applications 970. The window manager 942 may manage GUI resources used on the screen. The multimedia manager 943 may detect a format used to reproduce various media files and may encode or decode a media file through a codec appropriate for the relevant format. The resource manager 944 may manage the source code or memory space of the application 970. The power manager 945 may manage, e.g., the capacity, temperature, or power of the battery and determine and provide power information necessary for the operation of the electronic device using a corresponding piece of information of such. According to an embodiment of the present disclosure, the power manager 945 may interwork with a basic input/output system (BIOS). The database manager 946 may generate, search, or vary a database to be used in the applications 970. The package manager 947 may manage installation or update of an application that is distributed in the form of a package file. The connectivity manager 948 may manage, e.g., wireless connectivity. The notification manager 949 may provide an event, e.g., arrival message, appointment, or proximity alert, to the user. The location manager 950 may manage, e.g., locational information on the electronic device. The graphic manager 951 may manage, e.g., graphic effects to be offered to the user and their related user interface. The security manager 952 may provide system security or user authentication, for example. According to an embodiment of the present disclosure, the middleware 930 may include a telephony manager for managing the voice or video call function of the electronic device or a middleware module able to form a combination of the functions of the above-described elements. According to an embodiment of the present disclosure, the middleware 930 may provide a module specified according to the type of the operating system. The middleware 930 may dynamically omit some existing components or add new components.

The API 960 may be a set of, e.g., API programming functions and may have different configurations depending on operating systems. For example, in the case of Android or iOS, one API set may be provided per platform, and in the case of Tizen, two or more API sets may be offered per platform.

The application 970 may include an application that may provide, e.g., a home 971, a dialer 972, an SMS/MMS 973, an instant message (IM) 974, a browser 975, a camera 976, an alarm 977, a contact 978, a voice dial 979, an email 980, a calendar 981, a media player 982, an album 983, or a clock 984. The application 970 may also include a healthcare application (e.g., for measuring the degree of workout or blood sugar), or an application that provides environmental information (e.g., air pressure, moisture, or temperature information). According to an embodiment of the present disclosure, the application 970 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by applications of the electronic device to the external electronic device or receive notification information from the external electronic device and provide the received notification information to the user. The device management application may install, delete, or update functions (e.g., turn-on/turn-off the external electronic device (or some elements), adjusting the brightness (or resolution) of the display, etc.) of the external electronic device communicating with the electronic device or an application operating on the external electronic device. According to an embodiment of the present disclosure, the application 970 may include an application received from the external electronic device. At least a portion of the program module 910 may be implemented (e.g., executed) in software, firmware, hardware (e.g., the processor 210), or a combination of at least two or more thereof and may include a module, program, routine, command set, or process for performing one or more functions.

According to an embodiment of the present disclosure, a method for controlling, through an electronic device including a camera, another electronic device may comprise identifying a motion of an external object using a first image obtained by controlling the camera, obtaining first direction information based on the identified motion of the external object, driving at least one motor of the electronic device so that the camera faces a direction determined according to the first direction information, and identifying a second electronic device from a second image obtained by controlling the camera facing the determined direction.

According to an embodiment of the present disclosure, a method for controlling, through an electronic device including a camera, another electronic device may comprise transmitting data corresponding to the second image to at least one server through a communication interface of the electronic device, receiving data corresponding to the second electronic device determined based on the data corresponding to the second image from the at least one server, and identifying the second electronic device based on the received data corresponding to the second electronic device.

According to an embodiment of the present disclosure, a method for controlling, through an electronic device including a camera, another electronic device may comprise receiving at least one voice input, transmitting data corresponding to the at least one voice input to at least one server through a communication interface of the electronic device, receiving data corresponding to the second electronic device determined based on the data corresponding to the at least one voice input from the at least one server, and identifying the second electronic device based on the received data corresponding to the second electronic device.

According to an embodiment of the present disclosure, a method for controlling, through an electronic device including a camera, another electronic device may comprise, when the second electronic device is determined to be a controllable electronic device, obtaining data corresponding to the second electronic device from a memory of the electronic device, connecting with the second electronic device through a communication interface of the electronic device using the obtained data, and controlling the second electronic device.

According to an embodiment of the present disclosure, a method for controlling, through an electronic device including a camera, another electronic device may comprise, when the data corresponding to the second electronic device is not in the memory, receiving the data corresponding to the second electronic device from at least one server through the communication interface, connecting with the second electronic device using the data received from the at least one server, and storing the obtained first direction information and the data corresponding to the second electronic device received from the at least one server in the memory.

According to an embodiment of the present disclosure, a method for controlling, through an electronic device including a camera, another electronic device may comprise receiving at least one voice input, obtaining a command related to control of the second electronic device from the at least one voice input, and transmitting a signal corresponding to the obtained command to the second electronic device.

According to an embodiment of the present disclosure, a method for controlling, through an electronic device including a camera, another electronic device may comprise identifying a state change in the second electronic device using a third image obtained by controlling the camera facing the direction, and when the identified state change in the second electronic device does not correspond to the obtained command, outputting feedback corresponding to the at least one voice input.

According to an embodiment of the present disclosure, a method for controlling, through an electronic device including a camera, another electronic device may comprise outputting a request related to designation of a command corresponding to the second electronic device, storing the obtained first direction information and a command corresponding to the request in a memory of the electronic device, and upon receiving at least one voice input including the command stored in the memory, transmitting a signal corresponding to the command to the second electronic device.

According to an embodiment of the present disclosure, a method for controlling, through an electronic device including a camera, another electronic device may comprise, upon detecting a motion of the second electronic device, driving the at least one motor to trace the motion of the second electronic device, obtaining second direction information about the second electronic device based on a result of tracing the motion of the second electronic device, and storing the obtained second direction information in a memory of the electronic device.

According to an embodiment of the present disclosure, there may be provided a computer readable recording medium storing a program for executing a method for controlling, through an electronic device including a camera, another electronic device, the method comprising identifying a motion of an external object using a first image obtained by controlling the camera, obtaining first direction information based on the identified motion of the external object, driving at least one motor of the electronic device so that the camera faces a direction determined according to the first direction information, and identifying a second electronic device from a second image obtained by controlling the camera facing the direction.

As used herein, the term "module" includes a unit configured in hardware, software, or firmware and may interchangeably be used with other terms, e.g., "logic," "logic block," "part," or "circuit." The module may be implemented mechanically or electronically and may include, e.g., an application-specific integrated circuit (ASIC) chip, field-programmable gate arrays (FPGAs), or programmable logic device, that has been known or to be developed in the future as performing some operations.

According to an embodiment of the present disclosure, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., CD-ROM, DVD, magnetic-optical medium (e.g., floptical disk), or an embedded memory. The instructions may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

As is apparent from the foregoing description, according to an embodiment of the present disclosure, an electronic device may identify a user's motion and determine a particular object which the user desires to control based on the user's motion.

According to an embodiment of the present disclosure, the electronic device may identify at least one object through vision-based recognition. The electronic device may move or turn to at least one object.

The embodiments disclosed herein are proposed for description and understanding of the disclosed technology and does not limit the scope of the present disclosure. Accordingly, the scope of the present disclosure should be interpreted as including all changes or various embodiments based on the technical spirit of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device, comprising:
a camera;
at least one motor;
a communication interface;
a microphone;
at least one at least one processor; and
a memory electrically connected with the at least one processor, wherein the memory stores commands that, when executed by the at least one processor, cause the at least one processor to:
obtain voice input including information related to an external object through the microphone,
recognize, based on the voice input, the external object, drive the at least one motor such that the camera faces a direction corresponding to a position of the external object, identify the external object, based on an image obtained through the camera facing the direction, and when the external object is determined to be a controllable electronic device, obtain data corresponding to the external object from the memory.

2. The electronic device of claim 1, wherein the voice input includes at least one of the position of the external object, a shape of the external object, or a model name of the external object.

3. The electronic device of claim 1, wherein the memory stores commands that, when executed by the at least one processor, cause the at least one processor to:

transmit first data corresponding to the voice input to at least one server through the communication interface, receive second data corresponding to the external object from the at least one server, the second data is determined based on the first data, and recognize the external object, based on the second data corresponding to the external object.

4. The electronic device of claim 1, wherein the memory stores commands that, when executed by the at least one processor, cause the at least one processor to:

compare the information related to the external object with information stored in the memory, and recognize, based on the comparison result, the external object.

5. The electronic device of claim 1, wherein the memory stores commands that, when executed by the at least one processor, cause the at least one processor to:

transmit first data corresponding to the image to at least one server through the communication interface, receive second data corresponding to the external object from the at least one server, wherein the second data is determined based on the first data, and identify the external object based on the second data corresponding to the external object.

6. The electronic device of claim 1, wherein the memory stores commands that, when executed by the at least one processor, cause the at least one processor to:

connect the electronic device with the external object through the communication interface using the obtained data, and control the external object.

7. The electronic device of claim 6, wherein the memory stores commands that, when executed by the at least one processor, cause the at least one processor to:

when the data corresponding to the external object is not in the memory, receive the data corresponding to the external object from at least one server through the communication interface, and connect the electronic device with the external object using the data received from the at least one server.

8. The electronic device of claim 6, wherein the memory stores commands that, when executed by the at least one processor, cause the at least one processor to:

obtain a command related to control of the external object from the voice input, and transmit a signal corresponding to the obtained command to the external object.

9. The electronic device of claim 8, wherein the memory stores commands that, when executed by the at least one processor, cause the at least one processor to:

obtain an image of the external object through the camera after transmitting the signal, and identify, based on the image obtained before transmitting the signal and the image obtained after transmitting the signal, whether the external object performs a function corresponding to the command.

10. The electronic device of claim 1, wherein the memory stores commands that, when executed by the at least one processor, cause the at least one processor to:

identify coordinates of the external object corresponding to the position of the external object in a map of a space in which the electronic device is located, and drive the at least one motor such that the camera faces a direction corresponding to the coordinates.

11. A method for controlling, through an electronic device including a camera, an external object, the method comprising:

obtaining voice input including information related to the external object through a microphone of the electronic device;

recognizing, based on the voice input, the external object;

driving at least one motor of the electronic device such that the camera faces a direction corresponding to a position of the external object;

identifying the external object, based on an image obtained through the camera facing the direction; and when the external object is determined to be a controllable electronic device, obtaining data corresponding to the external object from a memory of the electronic device.

12. The method of claim 11, wherein the voice input includes at least one of the position of the external object, a shape of the external object, or a model name of the external object.

13. The method of claim 11, wherein recognizing the external object comprises:

transmitting first data corresponding to the voice input to at least one server through a communication interface of the electronic device;

receiving second data corresponding to the external object from the at least one server, the second data is determined based on the first data; and recognizing the external object, based on the second data corresponding to the external object.

14. The method of claim 11, wherein recognizing the external object comprises:

comparing the information related to the external object with information stored in a memory; and recognizing, based on the comparison result, the external object.

15. The method of claim 11, wherein identifying the external object comprises:

transmitting first data corresponding to the image to the at least one server through a communication interface of the electronic device;

receiving second data corresponding to the external object from the at least one server, wherein the second data is determined based on the first data; and identifying the external object based on the second data corresponding to the external object.

16. The method of claim 11, further comprising:

connecting the electronic device with the external object through communication interface of the electronic device using the obtained data; and controlling the external object.

17. The method of claim 16, further comprising:

when the data corresponding to the external object is not in the memory, receiving the data corresponding to the external object from at least one server through a communication interface of the electronic device; and connecting the electronic device with the external object using the data received from the at least one server.

18. The method of claim 11, further comprising:
obtaining a command related to control of the external object from the voice input; and
transmitting a signal corresponding to the obtained command to the external object.

19. The method of claim 11, further comprising:
identifying coordinates of the external object corresponding to the position of the external object in a map of a space in which the electronic device is located,
wherein driving the at least one motor comprises driving the at least one motor such that the camera faces a direction corresponding to the coordinates.

20. A non-transitory computer readable recording medium storing a program for executing a method for controlling, through an electronic device including a camera, an external object, the method comprising:
obtaining voice input including information related to the external object through a microphone of the electronic device;
recognizing, based on the voice input, the external object;
driving at least one motor of the electronic device such that the camera faces a direction corresponding to a position of the external object;
identifying the external object, based on an image obtained through the camera facing the direction; and
when the external object is determined to be a controllable electronic device, obtaining data corresponding to the external object from a memory of the electronic device.

* * * * *